(12) United States Patent
McBain et al.

(10) Patent No.: US 7,547,404 B2
(45) Date of Patent: *Jun. 16, 2009

(54) METHOD FOR MODIFYING EXISTING MOLD SYSTEMS TO UTILIZE AN IN-MOLD APPARATUS

(75) Inventors: Douglas McBain, Wadsworth, OH (US); Elliott Straus, Akron, OH (US); John Thompson, Wooster, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 734 days.

This patent is subject to a terminal disclaimer.

(21) Appl. No.: 10/536,301

(22) PCT Filed: Nov. 14, 2003

(86) PCT No.: PCT/US03/36514

§ 371 (c)(1),
(2), (4) Date: May 20, 2005

(87) PCT Pub. No.: WO2004/048076

PCT Pub. Date: Jun. 10, 2004

(65) Prior Publication Data

US 2006/0113693 A1    Jun. 1, 2006

(51) Int. Cl.
*B29C 45/76* (2006.01)
(52) U.S. Cl. .................. 264/40.1; 264/255; 264/328.8
(58) Field of Classification Search ............... 264/40.1, 264/255, 328.8
See application file for complete search history.

(56) References Cited

U.S. PATENT DOCUMENTS 4,115,506 A    9/1978    Shima
4,389,358 A    6/1983    Hendry
4,414,173 A    11/1983   Cobbledick et al.
4,534,888 A    8/1985    Cobbledick et al.
4,539,259 A    9/1985    Zuscik
4,668,460 A    5/1987    Ongena
4,711,602 A    12/1987   Baker
4,783,298 A    11/1988   Oda (Continued)

FOREIGN PATENT DOCUMENTS

EP    0 733 668 A2    9/1996

(Continued)

OTHER PUBLICATIONS

Straus, E.J. et al: "Optimizing Injection Gate Location and Cycle Time for the In-Mold Coating (IMC) Process," ANTEC. Conference Proceedings, XX, XX, 2001, pp. 1-5, XP002276341, p. 1, right-hand column, paragraph 2.

(Continued)

*Primary Examiner*—Jill L Heitbrink
(74) *Attorney, Agent, or Firm*—Fay Sharpe LLP

(57) ABSTRACT

A method of modifying an existing injection molding system so that the system can produce articles wherein at least one of the surfaces is coated while the article remains in the mold. The method includes the steps of providing a dispensing system for a coating composition and modifying an injection molding system to communicate with the dispensing system. The modification can include at least one nozzle to inject and direct the coating composition onto at least one surface of the molded article.

12 Claims, 18 Drawing Sheets

U.S. PATENT DOCUMENTS

| | | | |
|---|---|---|---|
| 4,840,553 A | 6/1989 | Arai | |
| 4,931,234 A | 6/1990 | Schad et al. | |
| 5,614,581 A | 3/1997 | Cobbledick et al. | |
| 5,777,053 A | 7/1998 | McBain et al. | |
| 5,849,168 A | 12/1998 | Lutz | |
| 5,902,534 A | 5/1999 | Fujishiro et al. | |
| 6,180,043 B1 * | 1/2001 | Yonemochi et al. | 264/255 |
| 6,220,743 B1 * | 4/2001 | Campestre et al. | 700/97 |
| 6,261,075 B1 | 7/2001 | Lee et al. | |
| 6,328,920 B1 | 12/2001 | Uchiyama et al. | |
| 6,409,955 B1 | 6/2002 | Schmitt et al. | |
| 6,890,469 B2 * | 5/2005 | Straus et al. | 264/255 |
| 2002/0039656 A1 | 4/2002 | McBain et al. | |

FOREIGN PATENT DOCUMENTS

| | | |
|---|---|---|
| EP | 0 934 808 A2 | 8/1999 |
| EP | 0 625 418 B1 | 3/2000 |
| EP | 1 207 031 A1 | 5/2002 |
| EP | 0 854 157 B1 | 7/2002 |
| EP | 0 934 808 B1 | 9/2002 |
| EP | 0 733 668 B1 | 6/2003 |
| FR | 2 781 715 | 7/1998 |
| JP | 04-184502 | 7/1992 |
| JP | 07032416 | 2/1995 |
| JP | 08-141727 | 6/1996 |
| JP | 09048044 | 2/1997 |
| JP | 09052262 | 2/1997 |
| JP | 2001-121572 | 5/2001 |
| WO | WO 95 13177 | 5/1995 |
| WO | WO 02 04187 A2 | 7/2000 |
| WO | WO 01 07230 A | 2/2001 |
| WO | WO 03 031138 A1 | 4/2003 |
| WO | WO 03 035354 A1 | 5/2003 |
| WO | WO 2004/048076 A3 | 6/2004 |

OTHER PUBLICATIONS

McBain D. et al: "Advances in In-Mould Coatings," Reinforced Plastics, Elsevier Advanced Technology, New York, NY, US, vol. 41, No. 5, May 1, 1997, pp. 34-35, 37, 39, XP00688827, ISSN: 0034-3617, p. 2, right-hand column, paragraph 1.

"Moldflow Design Principles," Moldflow Design Principles, XX, XX, 2001, pp. A, 1, I-VI, 1, 3, XP000783756, the whole document.

Jon Barrett: "Plastic Panels are Coated in Mould," Incorp: Engineering Materials & Design, 12 (Feb. 1992), No. 2, pp. 31-32, Horton Kirby, Kent, GB.

* cited by examiner

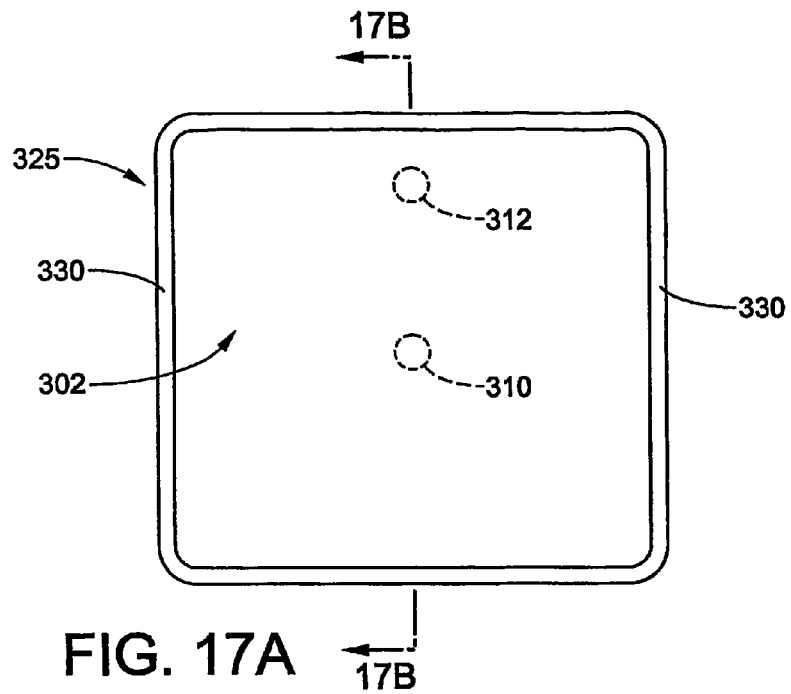
FIG. 17A
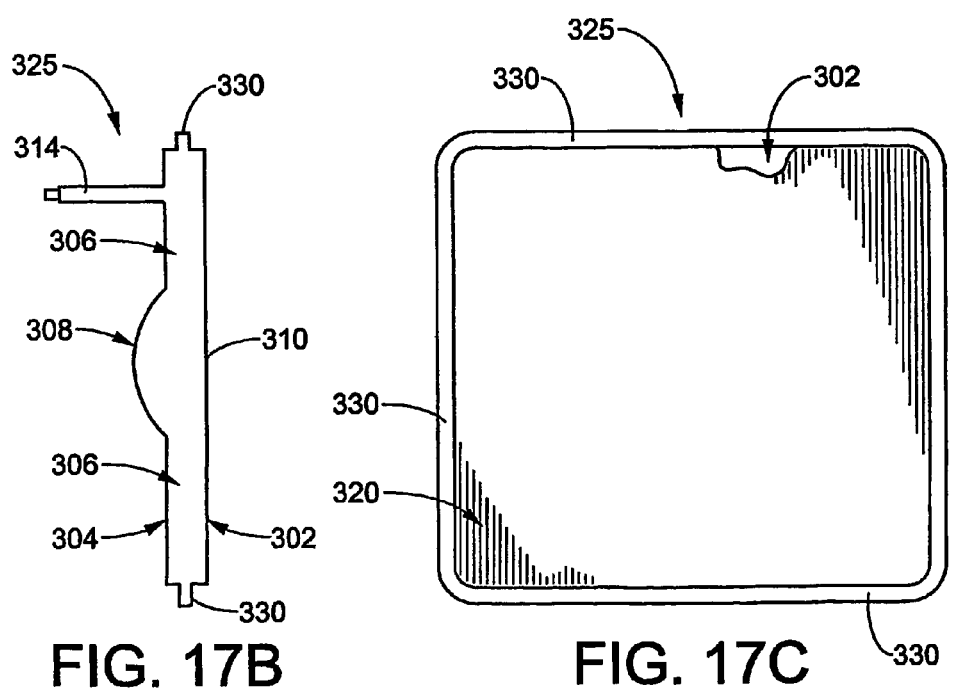
FIG. 17B
FIG. 17C

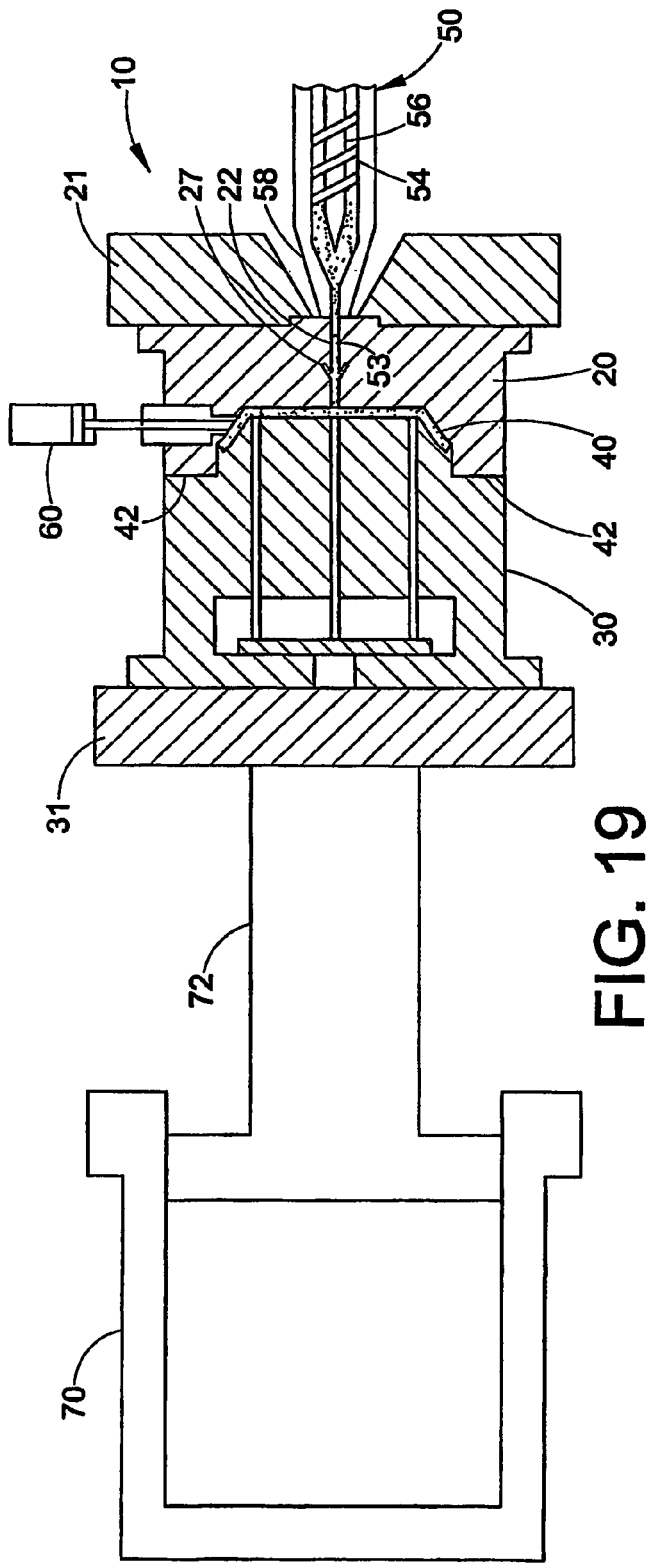
FIG. 19
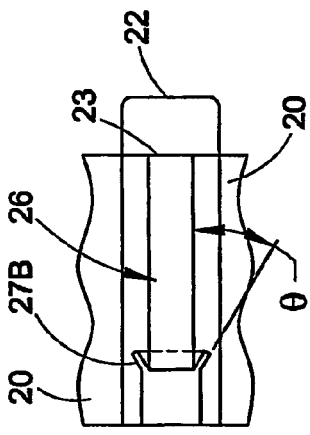
FIG. 24
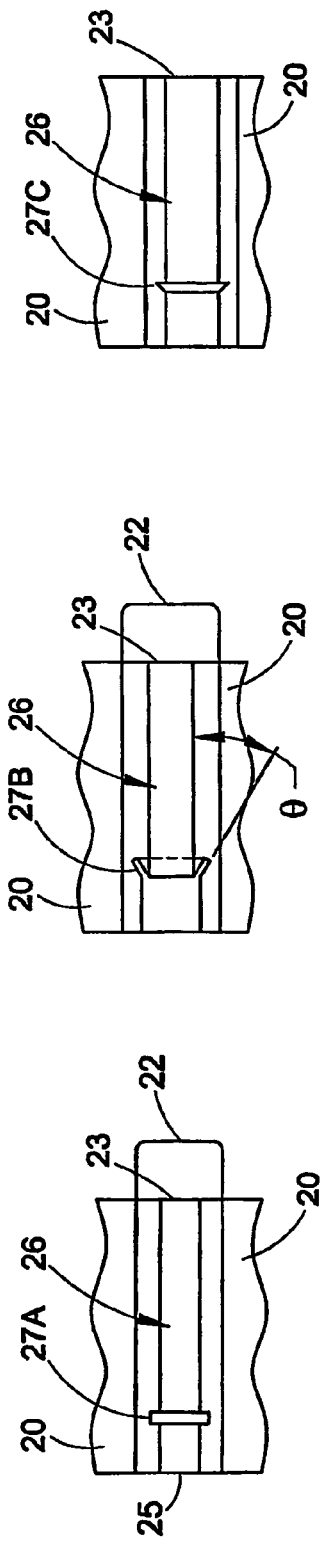
FIG. 23
FIG. 22

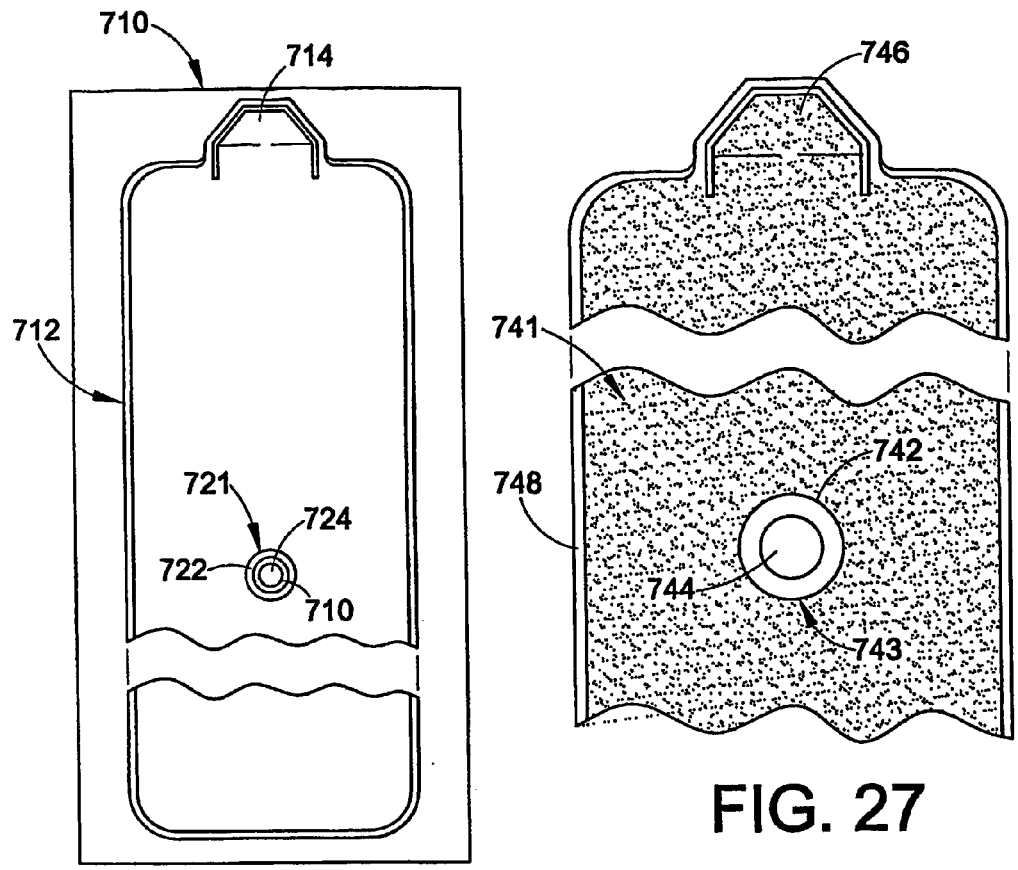
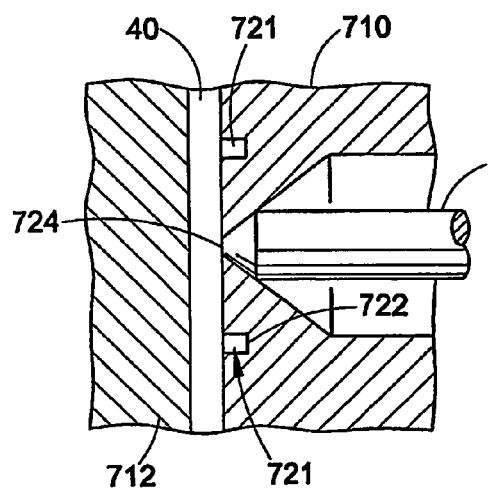
FIG. 28A
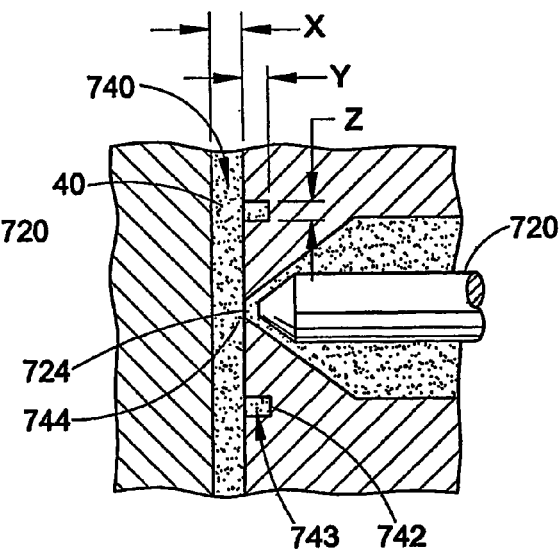
FIG. 28B

METHOD FOR MODIFYING EXISTING MOLD SYSTEMS TO UTILIZE AN IN-MOLD APPARATUS

BACKGROUND OF THE INVENTION

The present invention relates to injection molding systems and the use of an in-mold coating (IMC) in these systems; more particularly, to a method for modifying an existing molding system to allow it to use an IMC apparatus so that an article produced can be coated while in the mold of the molding system.

Molded thermoplastic or thermoset articles, such as those made from polyolefins, polycarbonate, polyester, polyethylene, polypropylene, polystyrene and polyurethanes, are utilized in numerous applications including those for the automotive, marine, recreation, construction, office products, and outdoor equipment industries. Automotive industry applications include, e.g., body panels, wheel covers, bumpers, head and tail lamps, fenders, hoods, and dashboards.

When the surface quality of molded articles does not meet required standards such as those for durability, chemical resistance, and weather resistance, or to facilitate paint adhesion, such articles must be coated.

Injection molding systems are used to produce thermoplastic or thermoset articles. They allow a substrate-forming material (typically a pelletized, granular or powdered plastic material fed from a hopper) to be heated to a temperature above its melting or softening point and, using a filling pressure, injected into a closed mold maintained under a clamping pressure until the mold is substantially full; then, using a packing pressure, the mold is completely filled with the substrate-forming material to form a workpiece. The machine then maintains, under a mold or clamp pressure, the workpiece as it cools until it can be removed from the mold without distortion. (The mold typically is opened and closed either mechanically or hydraulically, usually using a predetermined timing cycle.) Such injection molding probably is the most widely used method of producing plastic parts.

Molds used in these systems generally have two parts, one of which is stationary and the other movable. The mold cavity formed by these halves generally has a first surface on one mold half upon which a show or finished surface of the molded article will be formed and a corresponding second surface on the other mold half. The stationary half typically houses the cavity section of the mold and is mounted on a stationary platen in contact with the injection section of the cylinder of the injection machine. The movable mold half typically holds the core and ejector mechanism. Injection of substrate-forming material occurs under pressure when the mold is in a closed position. The clamping pressure, i.e., the pressure used to keep the mold closed during injection of the substrate-forming material, must be greater than the pressure used to inject that material.

SUMMARY OF THE INVENTION

The present invention provides a method of modifying an injection molding system to be operable with a dispensing apparatus so as to render the molding system capable of providing coated articles. The method involves (1) a molding system that includes an operating system and a molding machine and (2) a dispensing apparatus that can hold and deliver a coating composition and that optionally includes an operating system for controlling delivery of the coating composition and/or a data storage means. The molding machine of the molding system includes a mold with first and second mold sections and, in at least one of the mold sections, at least one nozzle for injecting a substrate-forming material. The operating system of the molding system communicates with the mold sections such that the sections can be actuated between open and closed conditions. The method includes the steps of modifying the molding machine to communicate with the dispensing apparatus and adapting the dispensing apparatus to function with the molding system so as to deliver, based on a set of predetermined parameters, coating composition into the mold when said mold sections are in a closed condition. Coating composition so delivered covers and coats predetermined portion(s) of at least one surface of a molded article formed and contained in the mold while the mold sections are in a closed condition, thus providing a coated article. The predetermined parameter set can include dispensing a set amount of coating composition at a set point in the molding cycle.

This method can include several optional variations. For example, one party can provide a molding system while another party provides the coating dispensing apparatus. Either of the parties can be responsible for performing one or both of the modifying and adapting steps.

Further, the mold can be further modified to include at a desired location at least one nozzle for injecting and directing the coating composition into the mold cavity formed by the mold sections. This dispensing apparatus optionally can be selectively and fluidly connectable with the at least one nozzle for the coating composition. Additionally, the dispensing apparatus can be selectively connectable with the molding machine and optionally include a moveable cart system to allow it to be re-positionable or be a portable system mountable on the machine. Where the coating composition is provided as a two-part system, a mixing apparatus can be provided so as to blend and mix the component parts before injection of the coating composition.

Still further, the mold can be modified to include at least one feature that enhances or restricts flow of the coating composition. This flow across the molded substrate can be modeled so as to determine optimal settings for the molding machine and/or the dispensing apparatus. Optionally, the mold can be further modified based on the results of this flow modeling.

The operating system of the molding system can control delivery of the coating composition into the mold.

Other optional additional steps also are possible. For example, a preferred substrate material and/or a preferred material for the coating composition can be determined; an optimal mold temperature and/or substrate temperature for injecting the coating composition into the mold can be determined; or at least one sensor can be mounted on the mold for measuring at least one mold variable and connected to the dispensing apparatus and/or the operating system.

BRIEF DESCRIPTION OF THE DRAWINGS

The drawings are only for purposes of illustrating certain embodiments of, and are not to be construed as limiting, the invention.

FIG. 14 is a plan view of a substrate having a removable containment flange extending completely around the perimeter of the substrate show surface.

FIG. 15A is a plan view of a substrate having a removable containment flange on the show surface of as well as on the perimeter so as to contain the coating to a predetermined area of the show surface, while

FIG. 17A is a front view of a molded substrate containing a readily compressible area at the location where a coating composition is to be injected onto the surface of the substrate, while FIG. 17B is a cross-sectional side view of FIG. 17A through lines 17B-17B and illustrates a compressible area below the point of coating composition injection and FIG. 17C is a front view of the molded substrate of FIG. 17A wherein the substrate has been coated.

FIG. 19 is a partial schematic view of a molding apparatus capable of coating a molded substrate and incorporating a mold runner.

FIG. 22 is a schematic view of a mold runner in a mold half while

FIG. 23 and FIG. 24 are schematic views of other mold runners with containment shroud.

FIG. 26 is a partial elevational view of a mold half having a barrier around a gate pin apparatus for preventing an IMC composition from entering a substrate injection device through the gate pin.

FIG. 27 is a partial elevational view of a coated substrate having a barrier which prevents IMC composition from entering the orifice of the injector for the substrate-forming material.

FIGS. 28A-C are partial cross-sectional views through a mold illustrating a gate pin and a barrier for coating composition flow.

DETAILED DESCRIPTION OF ILLUSTRATIVE EMBODIMENTS

Figure 1:
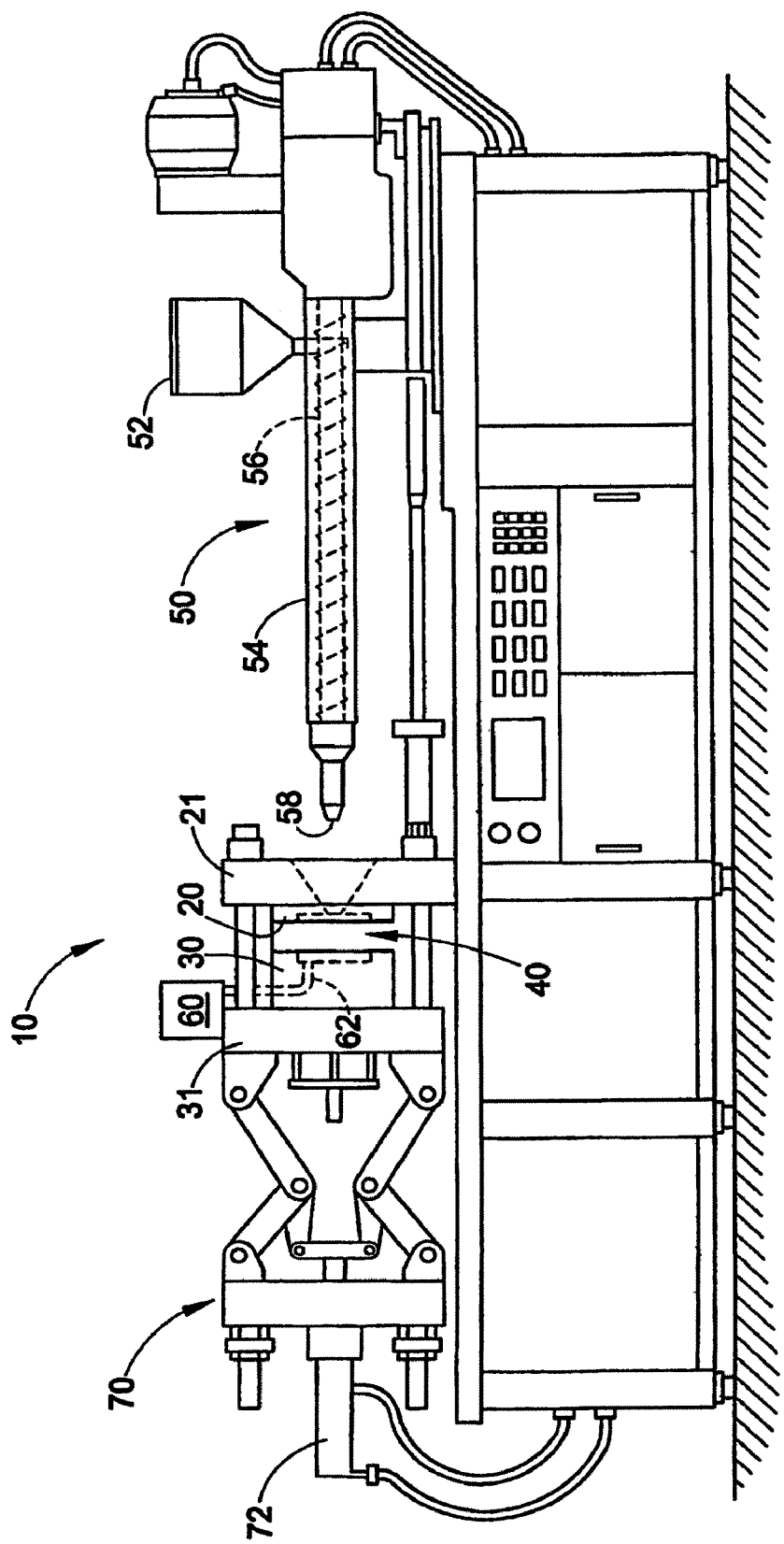
FIG. 1 is a side view of a molding apparatus suitable for practicing the method of the present invention.

In the drawings, like numerals indicate like or corresponding parts throughout.

FIG. 1 shows a molding machine 10 which includes a first mold half 20 that preferably remains in a stationary or fixed position relative to a second moveable mold half 30. As can be appreciated, the method of the present invention can be practiced on a wide variety of mold types and styles. Stationary mold half 20 is mounted to a platen 21 of molding machine 10. Moveable mold half 30 is mounted to platen 31 which is mounted to a clamping mechanism 70 of molding machine 10. FIG. 1 shows the mold halves in an open position. Mold halves 20 and 30 can mate, thereby forming a mold cavity 40 therebetween as shown in at least FIG. 2. Mold halves 20 and 30 mate along mold faces or surfaces 24 and 34, respectively, when the molding apparatus is in the closed position, forming a parting line 42.

The moveable mold half 30 reciprocates generally along a horizontal axis relative to the first or fixed mold half 20 by action of clamping mechanism 70 with a clamp actuator 72 such as through a hydraulic, mechanical, or electrical actuator as known in the art. The clamping pressure exerted by the clamping mechanism 70 preferably has an operating pressure in excess of the pressures generated or exerted by the first composition injector and the second composition or IMC injector which will be discussed in greater detail below. For example, pressure exerted by clamping mechanism 70 can range generally from 14 MPa (about 2,000 psi) to 103 MPa (about 15,000 psi), preferably from 27 MPa (about 4,000 psi) to 83 MPa (about 12,000 psi), and more preferably from 41 MPa (about 6,000 psi) to 69 MPa (about 10,000 psi) of the mold surface.

Figure 2:
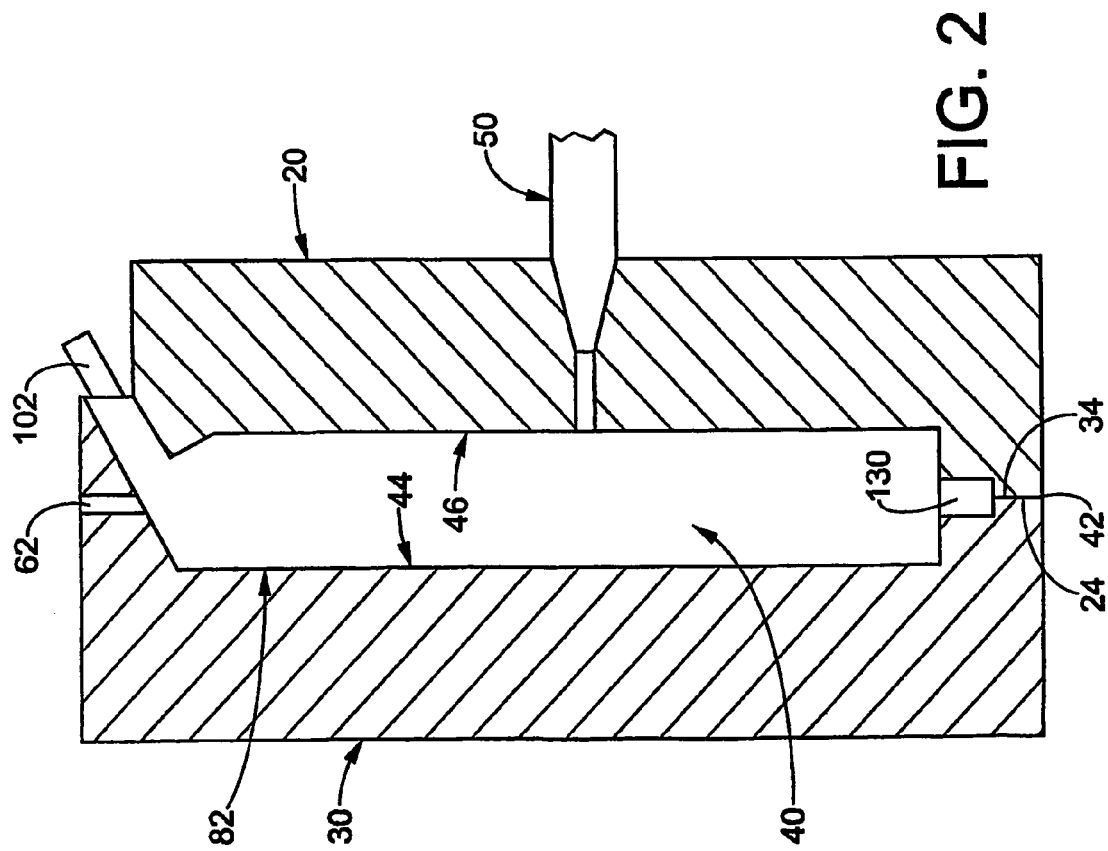
FIG. 2 is a cross section through a vertical elevation of a mold cavity.

In FIG. 2, mold halves 20 and 30 are shown in a closed position, abutted or mated along parting line 42. As illustrated, mold cavity 40 is shown in cross section, although the design of the cavity can vary greatly in size and shape according to the end product to be molded. Mold cavity 40 generally has a first surface 44 on the first mold half, upon which a show surface of an article will be formed, and a corresponding back side or opposite second surface 46 on the second mold half. The mold cavity is modified to contain separate orifices to allow the substrate-forming composition and the IMC composition to be injected independently therein. The location of the injectors and injection orifices can vary from apparatus to apparatus, and from part to part, and can be based on factors such as efficiency, functionality, workpiece geometry, etc.

As also shown in FIG. 1, the first (substrate-forming) composition injector 50 is a typical injection molding apparatus capable of injecting a thermoplastic or thermoset material, generally a molten resin, into the mold cavity. First injector 50 is shown in a ubacked-off position, but the same can be moved to a horizontal direction so that nozzle or resin outlet 58 mates with mold half 20 and can inject into mold cavity 40.

For purposes of illustration, first injector 50 is shown as a reciprocating-screw machine wherein a first composition is placed in hopper 52 and rotating screw 56 moves the composition through heated extruder barrel 54, where it is heated above its melting point. As heated material collects near the end of barrel 54, screw 56 acts as an injection ram and forces the material through nozzle 58 and into mold cavity 40. Nozzle 58 generally has a non-retum valve at the nozzle or screw tip to prevent the back flow of material into screw 56.

Because of the size and/or complexity of the part being formed, extrudate sometimes may be injected into the mold from more than one location. To control the flow of the extrudate through a manifold, it may be necessary to heat the extrudate. These manifold passages may be referred to as hot runners or manifold systems and are shown in detail in FIG. 16.

In operation, a predetermined quantity of a substrate-forming material is injected into mold cavity 40 from first injector 50, forming a substrate or workpiece. Substrate formed in the mold cavity has at least a show surface 82 and an opposite surface 84.

Suitable thermoplastic substrates include but are not limited to nylon, polyethylene terephthalate (PET), acrylonitrile butadiene styrene (ABS), acrylic, polystyrene, polycarbonate, acetal, polyolefins such as polyethylene and polyethylene, polypropylene, and polyvinyl chloride (PVC). This list is not exhaustive, only illustrative.

The present method modifies an existing molding system, which can include the mold itself, to allow an IMC composition to be introduced into mold cavity 40 from a second injector 60. Injection of IMC composition begins after the substrate forming material has developed sufficient modulus to receive a coating or when the mold cavity pressure or temperature is within a desired range. These conditions are described In more detail below.

In FIG. 2, second injector 60 is connected to a second nozzle 62 which is located in the mold half not containing the first injector 50. More specifically, first composition injection 50 is shown as located in fixed mold half 20 and second composition injector 60 is located in movable mold half 30. However, the position or number of second nozzle 62 is based on the portion of the workpiece to be coated and its geometry.

As shown in FIG. 2, the IMC composition 90 is injected through second nozzle 62 into mold cavity 40. The mold is not opened or unclamped before the IMC is applied. That is, the mold halves maintain a parting line and remain in a closed position during the injection of both compositions. IMC composition 90 spreads out and coats a predetermined portion or area of show surface 82.

Figure 16:
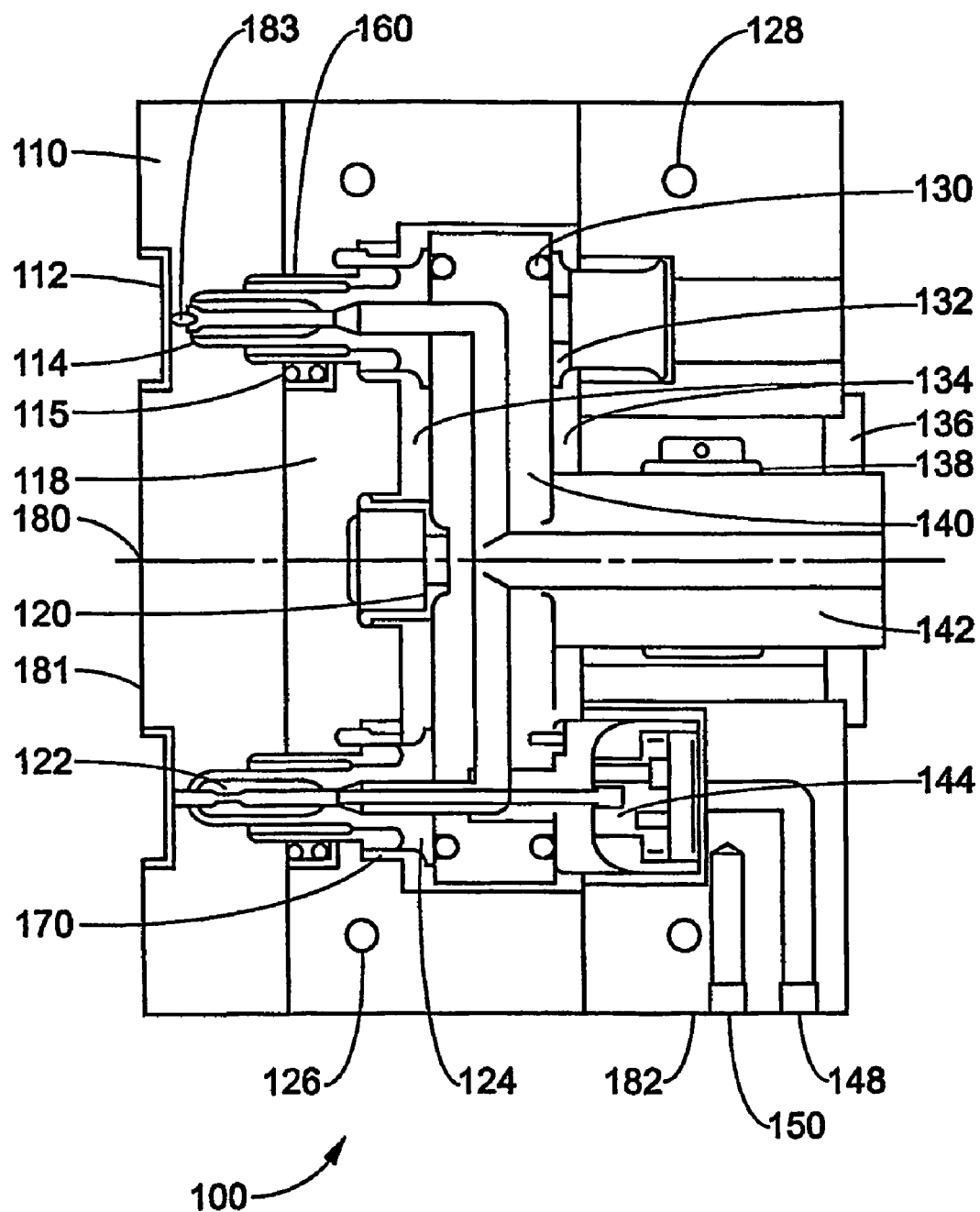
FIG. 16 is a cross section of a hypothetical first or stationary mold half of the type shown in FIG. 1.

FIG. 16 depicts a hypothetical first or stationary mold half of the general design shown in FIG. 1. The drawing depicts a typical runner system inside the mold used for the delivery of the substrate-forming material into the mold cavity and is illustrative of two types of gates, namely hot tip as indicated by 160 and valve gate system as indicated by 170. In FIG. 16, 100 is a mold half. The polymer being fabricated is delivered from the injection unit through the bushing 112. Cavity plate 110 is the portion of the mold adjacent the part to be formed. A nozzle tip insulator, the function of which is to prevent the cavity plate from acting as a heat sink, is indicated by 114. Nozzle heater 115 is also part of the system to maintain the correct temperature of the molten material being injected.

The manifold heater 118 functions to keep the manifold hot. Sprue insulator 120 functions as part of the temperature maintenance system. Nozzle tip 122 is the actual point of delivery into the mold of the molten material and is located in nozzle housing 124. Lines through which water or oil are circulated to heat or cool, as is required by the polymer being used, are indicated by 126 and 128. Manifold heater 130, nozzle insulator 132 and air gap 134 all are part of the temperature maintenance system. Locating ring 136 is used to locate the mold relative to the injection nozzle. Sprue heater 138 is located on sprue bushing 142. The manifold 140 generally is the basis or foundation for the whole molding system. Valve gate 144 is part of the delivery system for nozzle tip 122 and is actuated by air open conduit 150 and air close conduit 148. Pressure transducer 180 measures the pressure in the mold; more than one such transducer generally is used. A temperature transducer 182 is used to determine the temperature in the mold; more than one such transducer generally is used.

Injection of the material used to form the substrate can be viewed as a three-stage process. The first stage is usually referred to as injection high. The optimum pressure used to inject the material from the injection machine into the mold can be determined by experimentation, but it preferably is sufficiently great so that the mold is filled to at least about 85 to 95% of its capacity. The pressure time, plastic mold size, and configuration are all determining factors. Generally, the pressure is increased until flash is noticed at the parting line of the mold, at which point pressure is slightly decreased.

The second stage of injection is referred to as injection pack. It too can be determined by a series of experiments and preferably is of a magnitude such that, at its completion, the mold cavity is filled to at least 99% of its capacity.

After injection pack, injection pressure is reduced to keep the workpiece from distorting. This begins the third stage, referred to as injection hold. As with the others, it can be determined by experimentation.

In modifying a mold, determining the ultimate machine conditions of the system in connection with a specific mold, a specific substrate material and a specific IMC composition can be important. In setting up the modified mold, a large number of variables must be interrelated to produce acceptable parts in a commercially acceptable amount of time. Pressures, times and other settings of the injection machine vary with the shape of the part being manufactured and/or the polymeric material being used.

To optimize these and the other critical operating parameters of the injection process, a series of experiments can be run with the mold and a specific substrate-forming material. The volume of a given mold may be calculated. Based on this calculation and the density of the substrate-forming material, charge size can be determined. Differing machine variables can be tried until an optimum, complete filling of the mold in a minimum time, is determined. Preferably in these experiments, the mold is fitted with one or more transducers and/or sensors which measure pressure and/or temperature while various machine variables (e.g., injection speeds and pressures) are altered. Flow modeling based on the mold to opfimize the operating parameters also can be performed.

Variations in the amount of resin injected are tolerable in an amount of 00.5% of the total weight of the charge. Such variations occur in part because the resin is compressible and acceptable parts are produced within this range.

Determination of the optimum operating variables in the injection molding of a new part basically is an iterative (i.e., trial-and-error) technique. While an experienced technician may have some idea as to what is required, he nonetheless will generate a certain amount of scrap with any new configuration. Choices are made for certain variables such as, e.g., barrel temperature, mold temperature, injection high pressure limit, injection hold pressure, injection speed, fill time, and holding time. Extreme adjustments are made in an effort to bracket operable conditions which then may be fine tuned, and this is referred to herein as a bracketing procedure.

To exemplify this process, a series of experiments were run using a modified 771 Mg (850 ton) CINCINNATI MILACRON™ hydraulic clamp injection molding machine and a modified mold to determine the optimum machine settings in respect of a number of substrate materials. The machine settings found to yield optimum results are set out in Table I below. These settings were arrived at using a bracketing procedure. The mold used in this procedure resembles a valve cover for an automobile engine essentially having the shape of an open box with turned down sides.

These results might not necessarily be applicable to another molding machine. Rather, a new series of tests might be necessary based on the system to be modified. This is also true in the case of a different mold or resin. In such a case, similar tests would need to be run to find optimum operating parameters.

The examples used the following resins as the substrate-forming material:

Example 1: IMPET™ EKX215 glass-filled polyester (Ticona)
Example 2: IMPETT™ EKX230 glass-filled polyester (Ticona)
Example 3: FORTRON™ 4184L6 polyphenylene sulfide (Ticona)
Example 4: a PC/PBT alloy (GE Plastics; Pittsfield, Mass.)
Example 5: a polystyrene (Nova Chemicals Corp.; Calgary, Alberta).

TABLE I

Molding of Various Thermoplastics

|  | Example 1 | Example 2 | Example 3 |
|---|---|---|---|
| Machine set-points |  |  |  |
| Nozzle (° C.) | 261 | 261 | 304 |
| Barrel temp., zones A-D (° C.) | 265, 266, 266, 509 | 265, 266, 266, 265 | 314, 309, 308, 303 |
| Mold temp., zones 1-8 (° C.) | 260, 260, 149, 260, 149, 260, 260, 260 | 260, 260, 149, 260, 149, 260, 260, 260 | 304, 304, 149, 304, 149, 304, 304, 316 |
| Stationary mold temp. (° C.) | 117 | 117 | 133 |
| Moving mold temp. (° C.) | 135 | 135 | 147 |
| Inj, High, Pack, Hold (sec) | 10.0, 4.0, 4.0 | 10.0, 4.0, 4.0 | 10.0, 3.0, 2.0 |
| Cooling (sec) | 90.0 | 60.0 | 60.0 |
| Clamp open (sec) | 0.0 | 0.0 | 0.0 |
| Ejector forward dwell (sec) | 0.99 | 0.0 | 0.0 |
| Extruder delay (sec) | 0.0 | 0.0 | 0.0 |
| Core Set (Sec) | 0.8 | 0.8 | 0.8 |
| Inj. high pressure limit (MPa) | 15.2 | 15.2 | 15.2 |
| Inj. Pack pressure 1, 2 (MPa) | 6.9, 6.9 | 7.6, 7.6 | 5.5, 5.5 |
| Inj. Hold pressure 1, 2 (MPa) | 6.2, 6.2 | 6.2, 6.2 | 4.8, 4.8 |
| Shot size (cm) | 7.87 | 7.75 | 6.86 |
| Transfer position (cm) | 3.56 | 1.78 | 3.05 |
| Decompression before, after (cm) | 0, 0.76 | 0, 0.76 | 0, 0.76 |
| Inj. speed, % of shot size |  |  |  |
| Seq. 1 | 1.25, 80 | 1.25, 80 | 1.00, 80 |
| Seq. 2 | 1.10, 60 | 1.10, 60 | 1.00, 60 |
| Seq. 3 | 1.00, 40 | 1.00, 40 | 1.00, 40 |
| Seq. 4 | 1.00, 20 | 0.60, 20 | 1.00, 20 |
| Seq. 5 | 0.60, X-FER | 0.60, X-FER | 0.60, X-FER |

|  | Example 4 | Example 5 |
|---|---|---|
| Machine Set-points |  |  |
| Nozzle (° C.) | 288 | 272 |
| Barrel Temp., Zones A-D (° C.) | 288, 288, 288, 288 | 282, 282, 276, 272 |
| Mold Temp., Zones 1-8 (° C.) | 288, 288, n/a, 288, 288, n/a, 288, 288 | -n/a- |
| Stationary Mold Temp. (° C.) | 109 | 86 |
| Moving Mold Temp. (° C.) | 141 | 119 |
| Injection High, Pack, Hold (sec) | 10.0, 3.0, 2.0 | 8.0, 2.0, 2.0 |
| Cooling (sec) | 120.0 | 140.0 |
| Clamp Open (sec) | 0.0 | 0.0 |
| Ejector forward dwell (sec) | 0.0 | 0.0 |
| Extruder delay (sec) | 0.0 | 0.0 |
| Core Set (Sec) | 0.8 | 0.8 |
| Injection high pressure limit (MPa) | 15.2 | 15.2 |
| Injection Pack pressure 1, 2 (MPa) | 8.3, 8.3 | 9.7, 9.7 |
| Injection Hold pressure 1, 2 (MPa) | 7.2, 7.2 | 8.3, 8.3 |
| Shot size (cm) | 7.87 | 8.38 |
| Transfer position (cm) | 2.03 | 2.03 |
| Decompression before, after (cm) | 0.00, 0.76 | 0.00, 0.56 |
| Injection Profile (Speed, % of shot size) |  |  |
| Seq. 1 | 2.25, 80 | 2.75, 80 |
| Seq. 2 | 2.50, 60 | 2.50, 60 |
| Seq. 3 | 2.25, 40 | 2.25, 40 |
| Seq. 4 | 0.40, 20 | 200, 20 |
| Seq. 5 | 0.60, X-FER | 1.00, X-FER | n/a = not applicable

Having determined the operating parameters for production of the substrate, one must then determine, by reference to appropriate tables or by measurement, the melt temperature of the substrate-forming material so that the IMC composition may be injected at the proper time. By use of transducers or sensors referred to above with respect to FIG. 16, it is possible to determine when the temperature of the substrate has cooled below the melt temperature of its constituent material(s). Alternatively, the melt temperature can be determined indirectly by observing pressure. When a molded part reaches its melt temperature, it starts to contract somewhat, thus reducing the pressure.

If transducers are not used, the time when the melt temperature is reached and injection of IMC composition commences can be determined and then used to control the operation. In other words, the length of time between the mold closing and the substrate reaching its melt temperature can be determined and used to control the start of injection of IMC composition.

A series of experiments using a modified machine and IMPET™ 430 resin and STYLECOAT™ X primer (OMNOVA Solutions Inc.; Fairlawn, Ohio) as the IMC composition were run. By temperature measurements, the substrate resin was determined to have cooled sufficiently below its melt point 50 seconds after the mold had closed. Three parts were run using a 90-second cure time for the IMC. These parts showed good coverage and curing.

A further 33 parts were run to confirm these machine settings and all of the parts were acceptable, i.e., good appearance and adhesion. A further sample was run injecting the IMC only 30 seconds after the mold closed and using a cure time of only 60 seconds. This part was unacceptable because some portions were only lightly coated. This confirmed the correctness of previous machine settings.

Another series of parts were made using VANDAR™ 9114 PBT polyester alloy as a substrate resin. The resin had cooled below its melt temperature 30 seconds after the mold closed. These parts all demonstrated good appearance, i.e., even coverage and good adhesion.

To illustrate more clearly the necessity of injecting the IMC composition at the proper time (i.e., immediately after the surface of the substrate resin cools to its melt temperature) contrasted with an injection that occurs too early or too late, a series of experiments (5 parts each) was run on a modified TOSHIBA™ 950 injection molding machine using a hydraulic clamp, VANDAR™ 700 resin, and STYLECOAT™ primer as IMC composition. The machine settings were determined as described above and were identical except for the time at which the IMC composition was injected, i.e., the Interval in seconds between the closing of the mold and the commencement of the injection of the IMC. The results of these experiments are set forth in Table II below.

TABLE II

| Delay after mold closed (sec.) | Cure time (sec.) | Coater setting | Coater speed | Comments: |
|---|---|---|---|---|
| 10 | 160 | 235 | Slow | Poor appearance, coating intermingled with substrate |
| 15 | 160 | 235 | Slow | Poor appearance, coating intermingled with substrate |
| 25 | 160 | 235 | Slow | Poor appearance, coating intermingled with substrate |
| 40 | 160 | 225 | Slow | Good appearance; extended cure time for center of parts to have good cure |
| 100 | 160 | 235 | Slow | Poor appearance, coating not well adhered and poor coverage |
| 120 | 160 | 235 | Slow | Poor appearance, coating not well adhered and poor coverage |

These examples demonstrate the desirability of determining and setting the system so that the IMC composition is injected at the time when the surface temperature of the substrate just falls below its melt temperature. Therefore, the present method can include determining and setting the oeprating parameters including optimal time to inject the IMC composition.

Figure 3:
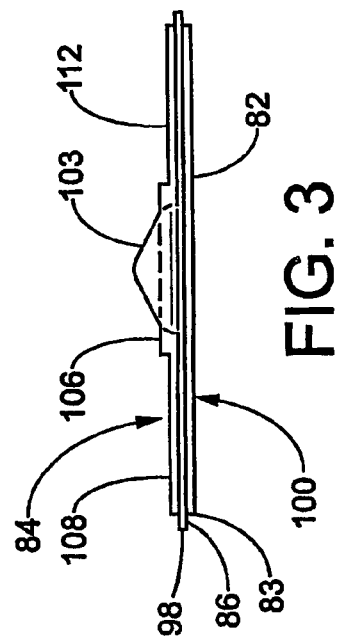
FIG. 3 is a top view of a molded substrate prior to being coated. The substrate is shown having an area of increased thickness to promote and/or channel flow of coating composition.

As stated above, a substrate can be selectively coated in predetermined areas. In addition, the selective coating can be further controlled by modifying the molds to control or modify the thickness or depth of the substrate. In this respect, the thickness or depth is defined as a distance, girth, or dimension from one surface to the opposite surface of the substrate. The modification to the mold for increasing the IMC composition flow is generally concerned with the depth between two surfaces, the first being a surface to which an IMC composition is selectively directed or applied, commonly referred to as a show or appearance surface, and the back surface that is substantially opposite. The IMC may but does not necessarily cover the entire show surface For example in FIG. 3 thickness refers to the distance from show surface 82 to the backside or opposite surface 84. As shown in FIG. 3, the thickness between the show surface and back side of the substrate can vary.

Each substrate inherently has a compressibility factor, i.e., at a given temperature, a given subtrate is compressible to a specific, calculable percentage. Therefore, even though a molded article or substrate has a single compressibility ratio, a first area of a substrate which is thicker than a second area can compress a greater thickness or distance. For example, a given substrate might have a compressibility ratio of 20% at a certain temperature. Therefore, a portion of the substrate which has a thickness of 2.0 cm can compress 0.4 cm whereas another portion which has a thickness of 1.0 cm can only compress 0.2 cm at the same temperature.

This compressibility can be utilized to selectively coat predetermined areas of a substrate by modifying the mold accordingly. Substrate compressibility also can be utilized to effectively direct the flow of an IMC into certain areas or pathways of a substrate.

As stated above, IMCs can be applied to a substrate in numerous, well known ways. Referring to FIG. 2, shown is an IMC (or second) composition injector 60 having a nozzle 62 on the molding apparatus in a suitable location such as on mold half 30. A first quantity of the first composition is injected Into a mold cavity to a desired predetermined level, forming a substrate, work piece, or article, such as plaque 100 shown in the views of FIGS. 3-5.

Figure 4:
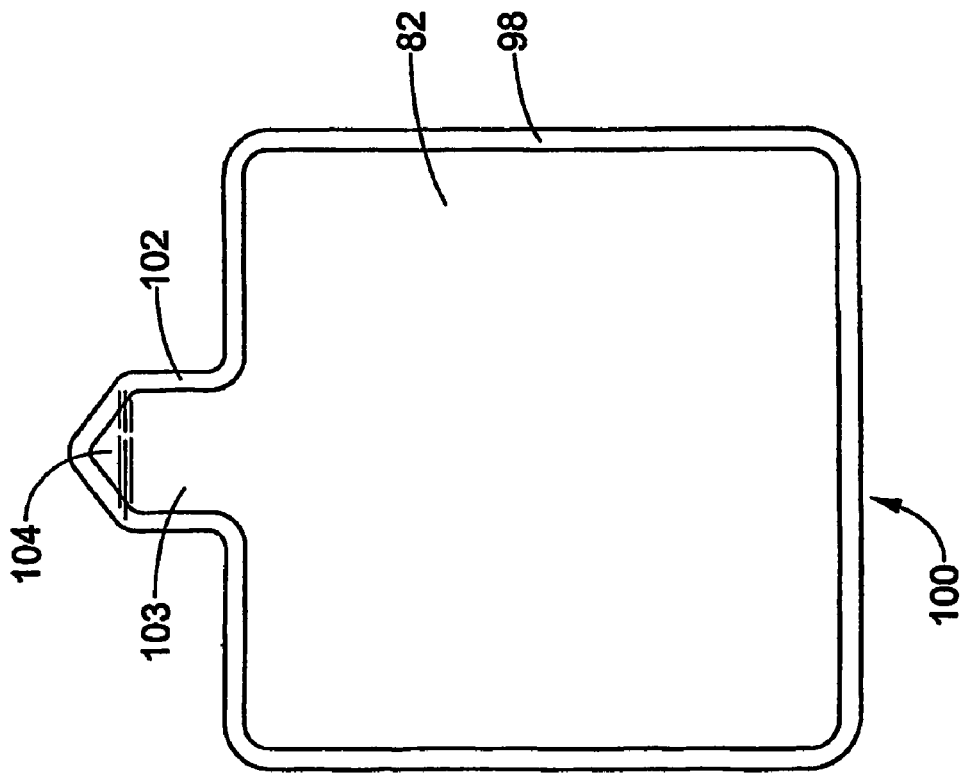

As shown in FIG. 3, the substrate has at least a show surface 82 and back side 84. An IMC composition 90 is then injected into the mold cavity from injector 60 through at least one nozzle 62 onto the show surface side of the substrate at a location such as 104 on tab 103 as shown in FIG. 4.

The mold is not opened or unclamped before and/or during injection and curing of the IMC composition, that is, the mold halves maintain a parting line and generally remain a substantially fixed distance from each other while both the first and second compositions are injected into the mold cavity.

The liquid IMC composition disperses or radiates onto show surface 82 from the point of injection 104, the location of which depends on where the IMC composition injector and nozzle thereof is positioned in the modified molding apparatus. Accordingly, the point where the IMC composition is injected can be substantially anywhere on show surface 82 and is not limited to the locations shown in the drawings.

The IMC composition cures on the substrate so as to form a coating. The cure is optionally heat activated from sources including, but not limited to, the molded substrate, the mold itself, or by temperature controlled fluid flowing through the mold.

Modification of the mold can include directing or channeling the flow of an IMC composition on the substrate. As stated above, through the control of variables of the molding process, an amount of material that will produce a desired substrate can be determined experimentally or by flow modeling. After the first composition has been Injected into the mold cavity and has cooled below the melt point or otherwise reached a temperature sufficient to accept or support an IMC, a predetermined amount of IMC composition is injected from injector 60 onto an injection point of the substrate, preferably on a show surface thereof. The coating composition is injected at a pressure that ranges generally from about 3.5 to about 35 MPa (500 to 5000 psi) and typically from about 7 to about 30 MPa (1000 to 4500 psi) so as to promote the spread of the IMC composition away from the nozzle between a mold surface and a surface of the substrate. Flow of the IMC is controlled by modifying the mold to vary the thickness or depth of the resin of the substrate below the surface to be coated which directs the IMC to preferred areas of the substrate. For example, if a mold cavity is designed so that a substrate has a constant thickness under an area to be coated, the IMC composition will spread from the location of injection In a substantially radial, even, constant manner. Under the same relative conditions, if a substrate is formed having areas which vary in thickness under the surface area to be coated, the IMC composition can be channeled to flow in area(s) of greater relative thickness. Thus, the depth of the coating also can vary on the coated surface. The compressibility of the substrate allows a substrate area having a greater depth relation to a second area to compress more and better accommodate IMC flow and promote migration thereof. Substrate temperature also is a factor in compressibility and, therefore, a factor affecting flow.

Figure 5:
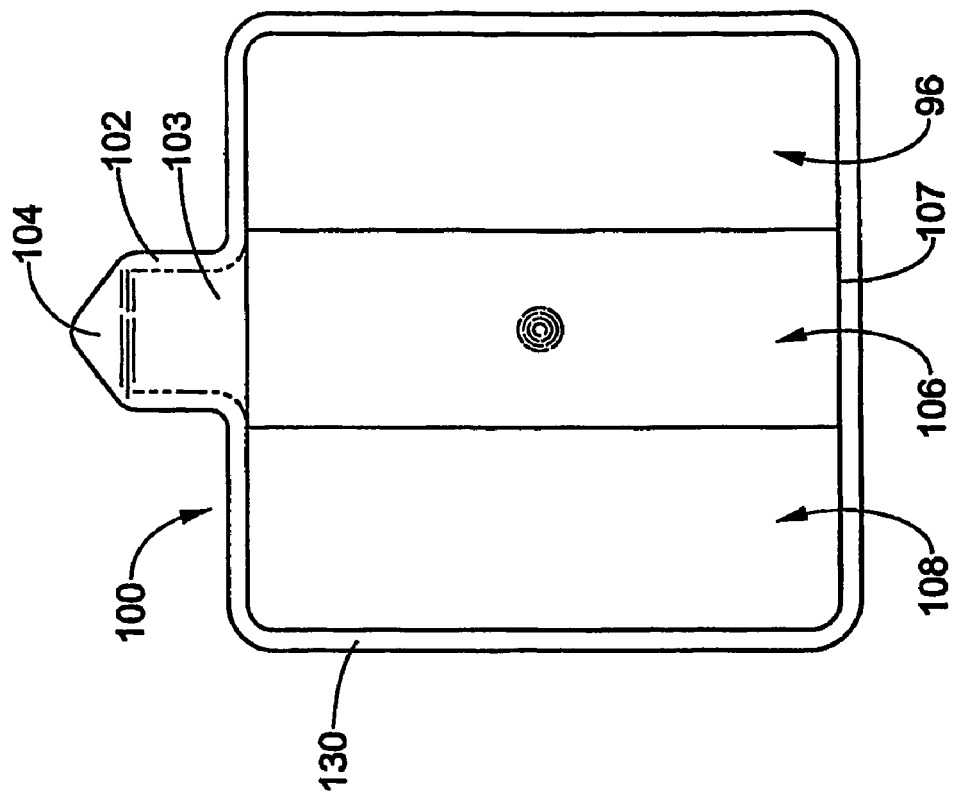
FIG. 4 and FIG. 5 are, respectively, front and back views of the substrate shown in FIG. 3.

In another potential modification to the mold, a substrate is provided with an area of increased thickness around the point where the IMC composition is injected onto the substrate. By increased thickness is meant that the thickness of the substrate around the IMC composition injection location is greater than the thickness of at least one other area or section of the substrate. As shown in FIG. 5, plaque 100 is shown with a tab area 103 at a location of IMC injection. The thickness of tab area 103 can be varied to enhance channeling of the IMC composition. Tab section 104 in FIG. 4 includes a thin section or containment tab flange 102 which prevents the IMC composition from flowing out of the mold cavity. The containment flange will be further discussed below. The relatively thick tab area promotes coating composition flow from the IMC nozzle onto show surface 82 of the substrate as the IMC composition tends to avoid substrate sections of minimal or lesser thickness such as the tab.

Figure 6:
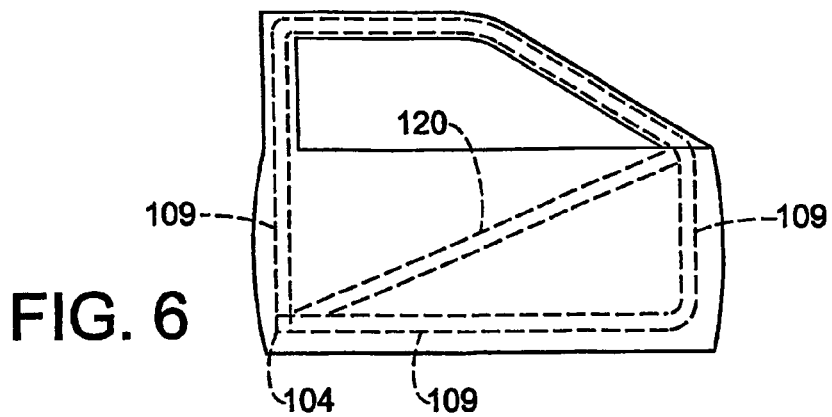
FIG. 6 is a side view of a molded door panel. The door panel is provided with areas of varying depth to channel flow of coating composition.

In yet a further modification to the mold, a substrate is provided with at least one "runner" section, preferential flow channel, or area to promote IMC composition flow on a substrate. A runner is an area which is relatively thicker than another area adjacent thereto, wherein the IMC composition can be routed to flow preferentially. Advantageously, runner sections can be provided on substrates of complex design or otherwise difficult to coat. A runner section generally is located in an area on the substrate beginning near the point of injection of the IMC composition and extending away therefrom to a predetermined point or terminus on the substrate. For example, FIG. 5 has a runner section 106 extending from and including tab area 103 to substantially the bottom end 107 of plaque 100; FIG. 6 shows a door panel having three runner sections 109. Depending on the amount of IMC composition injected into a mold cavity, the show surface having a runner section can be completely coated or coated only in certain areas such as the runner section. The amount of coating applied and thickness thereof can vary from part to part.

The depth of the runner section can vary depending on the substrate to be coated and design specifications. A substrate can have a runner section extending from an area of IMC composition injection which is so relatively thick that all of the IMC application to the substrate surface remains substantially in the runner section. Therefore, as can be imagined, many unique effects can be created by modifying the molding system to utilize runner sections. For example, a runner section can be utilized to channel coating composition to a distal part of a substrate surface. The runner section thickness can be gradually decreased in a direction away from the point of injection as needed, or even separated or divided into more than one runner section, to accomplish a desired coating effect.

A molded substrate or article also can be provided with a containment flange 98. As shown in at least FIG. 4, containment flange 98 can extend completely around the perimeter of a substrate, specifically plaque 100. Flange 98 can be used as a barrier to prevent the IMC composition from leaking out of the mold cavity and potentially blowing out of the parting line. As shown in at least FIG. 3, flange 98 is generally offset or formed in a plane below that of show surface 82. Thus, show surface 82 has an edge 83 which transitions into flange 98. Show surface edge 83 drops off into a wall at an angle of about 900 relative to the show surface. Substrate wall 86 terminates at flange portion 98, wherein flange portion extends at an angle of about 90° in relation to wall 86. The relatively sharp angles between show surface 82 and flange 98 as well as the relative incompressibility of the thin flange act are believed to act as a substantial barrier to flow of IMC composition. Flange 98 generally has a thickness less than the thinnest portion or area of the substrate. As shown in FIG. 3, flange 98 is thinner than section 96, the relatively thinnest section of the substrate. Flange 98 encompasses substantially the entire perimeter of a substrate surface to be coated and generally has a width of no more than about 0.57 to about 0.45 cm (0.225 to 0.176 in.), desirably no more than about 0.44 to about 0.19 cm (0.175 to about 0.076 in.), and preferably no more than about 0.19 to about 0.11 cm (0.075 to about 0.045 in.).

Figure 7:
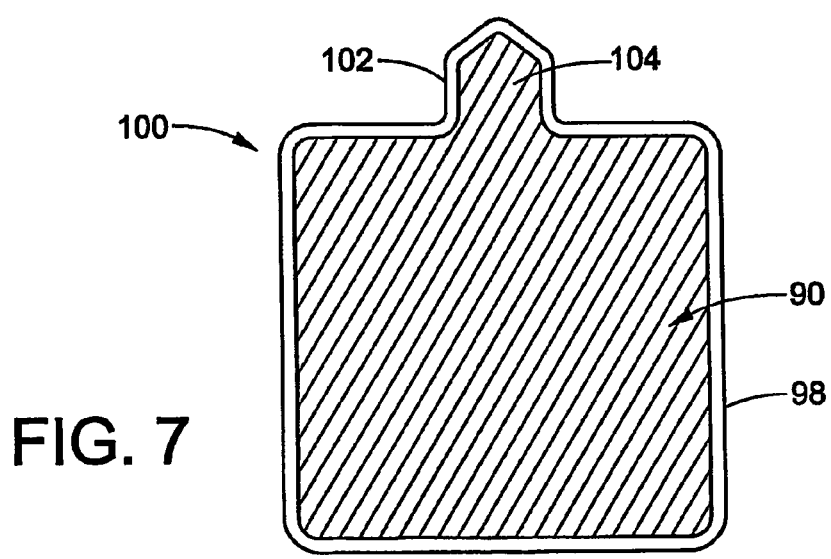
FIG. 7 is the substrate of FIG. 4 coated on a show surface thereof.
Figure 8:
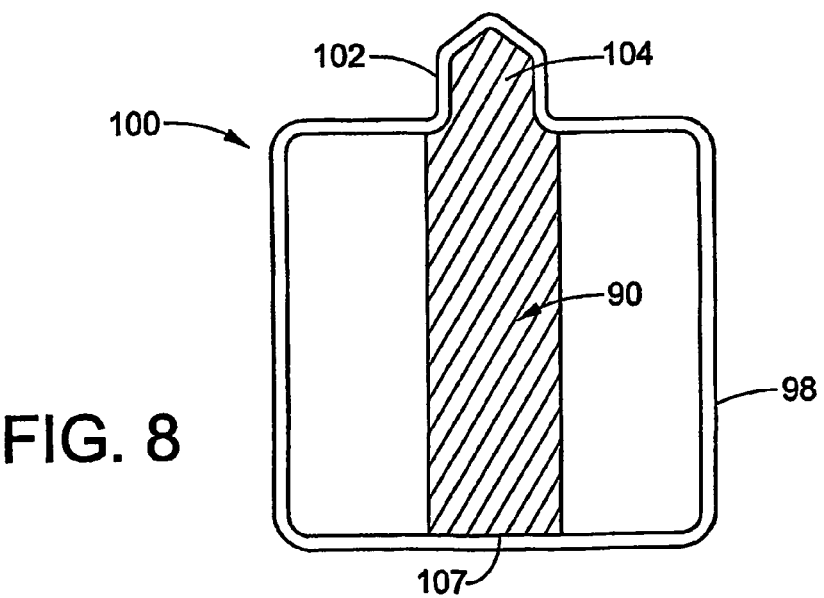
FIG. 8 is the substrate of FIG. 4 having a coating located substantially only in a runner section of the show surface.

As shown in FIG. 7, IMC 90 covers the entire show surface of the molded substrate. Due to the configuration of the molded substrate as well as other molding variables, coating 90 does not cover flange 98, although it can. Due to the design of flange 98, generally less than about 10%, desirably less than 5%, and preferably less than 1% by weight of the IMC covers flange 98. Flange 98 is free of any other substrate material on the distal edge thereof. There is no other substrate material or outer edge between the flange and the parting line.

The mold can also be modified to include a breakable, removable flash edge or containment flange. Molded articles, parts, or substrates most often are constructed to conform to certain predetermined, definite tolerances. Frequently, the articles are designed to fit exactly or substantially exactly into an assembly or working arrangement of parts. Articles provided with an additional containment flange to contain a coating often are larger than specified manufacturing tolerances. Furthermore, often the containment flange show surface is not coated with an IMC, leaving the article with an undesirable appearance.

Keeping a liquid, uncured IMC composition confined to an intended substrate target surface area is extremely difficult. Frequently, the composition flows or leaks onto surrounding mold surfaces, such as around the parting line; non-show surfaces of the article which are not to be coated; and even out of the mold itself. Another problem associated with coating leakage is that the coating composition may not become properly packed in the mold resulting in coated parts having dull appearances, parts not having an even film build or adequate coating thickness, or parts not exhibiting the desired or required texture. Coating seepage onto ejector pins can cause binding and unworkability of the molding apparatus. Such overflow is unacceptable as parts can be ruined, and mold surfaces must be cleaned to remove coating buildup.

A mold system modified according to the present method prevents the aforementioned problems by making changes to the mold so that the molded article or workpiece has an IMC containment flange or flash edge which is flexible and thus easily removable, e.g., by hand after the article has been coated and the coating cured. The coated article with the removable containment edge removed can be used as is in an assembly. One advantage of the removable containment flange, which may only be partly coated and possibly unsightly, is that it can be easily removed and discarded. Moreover, a fully coated part of desired dimensions and exact standards can be produced. Labor and monetary savings are other advantages as coating containment is achieved, and waste is minimized. The removable containment flange potentially eliminates part painting operations, secondary handling, and shipping costs between a part molder and a painter.

Figure 11:
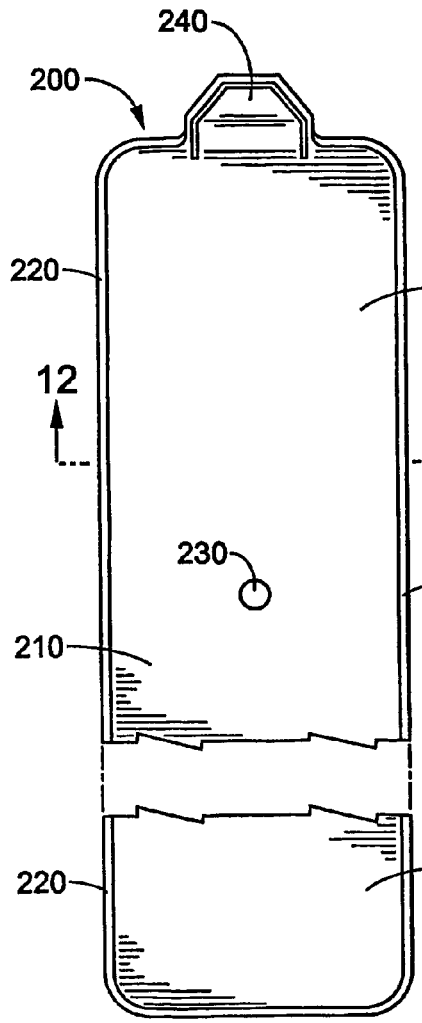
FIG. 11 is a plan view of a substrate having a removable, flexible containment flange.

Referring to FIG. 11-15B, molded articles or substrates having removable flexible containment flanges are shown. Shown In FIG. 11 is an article 200. The main or show surface 210 is coated. Due to the presence of the removable containment flange 220, the IMC composition is prevented from leaving the surface of the substrate and contaminating other mold surfaces or the back side of the molded article.

Figures 14, 15A:
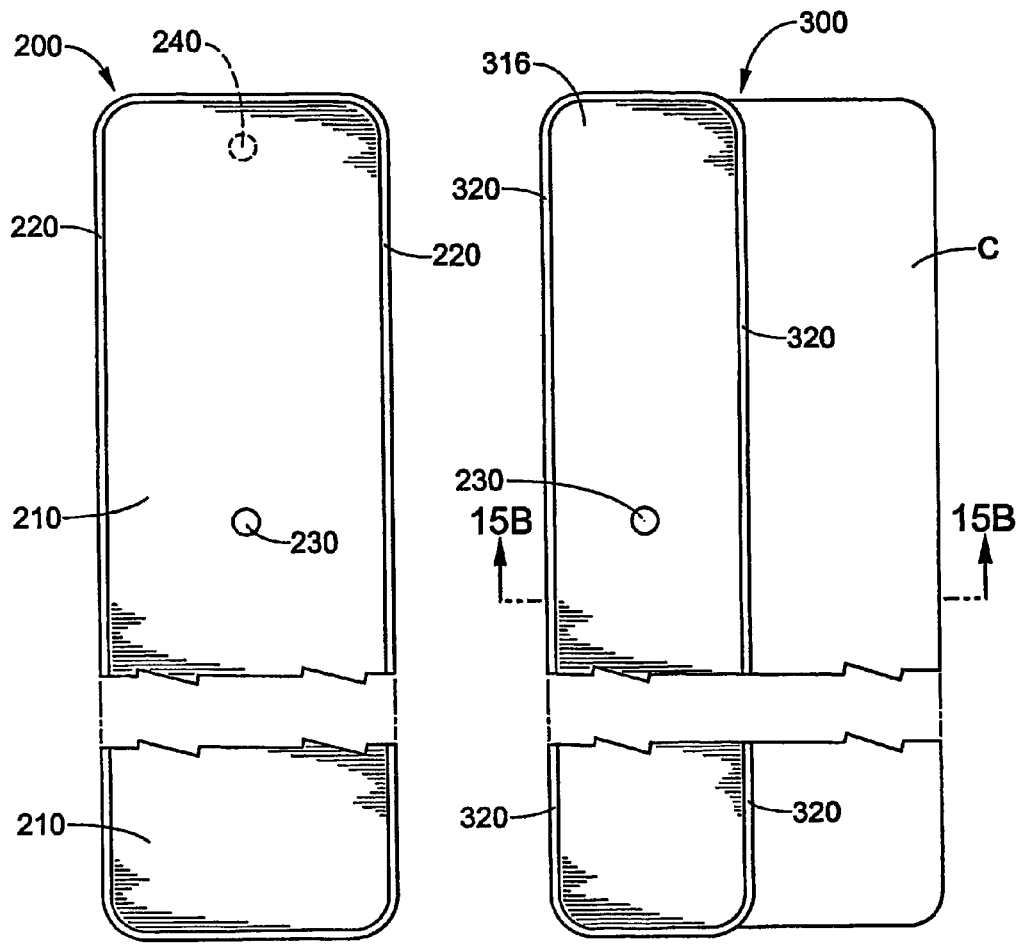

FIG. 11 also illustrates substrate injection area 230 where the substrate-forming material was injected into the mold. IMC composition injection area 240 shows the ingress point of the IMC composition which then has spread across the show surface. Removable flange 220 extends caround the periphery of the show surface to inhibit flow off of the main surface, excepting the area around the Injection area 240 which already Includes a feature for containment. Removable flange 220 is shown as extending around the entire periphery of the show surface, although it could extend around only a portion if, e.g., the workpiece includes flow restricting geometry. FIG. 14 shows a removable flange 220 extending around the periphery of the main surface of substrate 200. IMC composition injection inlet area 240 is also shown. Again, the removable flange can extend less than the complete distance around the perimeter of the substrate main portion if some other containment feature is present or substantially no leakage occurs in the specific area.

Figure 12:
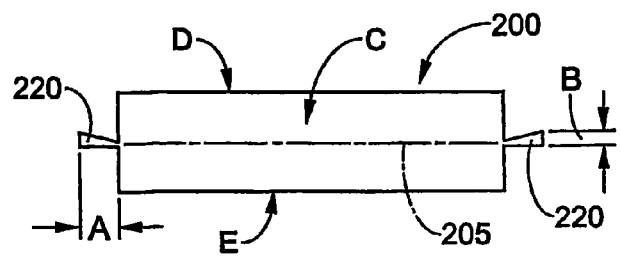
FIG. 12 is a cross section of FIG. 11 through 12-12 illustrating a removable containment flange.

The removable flange is located or formed on a substrate surface in an area or plane between the show surface edge or perimeter and a backside edge or perimeter of the part. No matter which flange is utilized, each flange has a width and a depth or height. As shown in FIG. 12, the width A can be defined as the greatest distance the flange extends outward or away from the substrate main body C at a location between a show surface D to be coated and the non-show surface E opposite therefrom. Depth B can be considered a depth or thickness measurement, which can vary along the width of the flange, with the greatest depth generally existing at the outermost portion of the flange. The flange is designed to have a very thin section located adjacent to, or in the vicinity of, the substrate which is readily breakable. Removing the flange is as simple as, for example, flexing it back and forth to break the leading edge thereof away from the edge of the part main surface. Although not necessary, the flange also can be removed with tools such as a cutting edge, hot edge tools, water jet, buffer, sander, router, and the like.

Figure 13A:
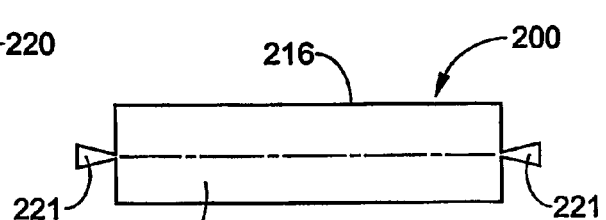
FIGS. 13A through 13D are cross sectional illustrations of molded substrates having removable containment flanges of various configurations.
Figure 13B:
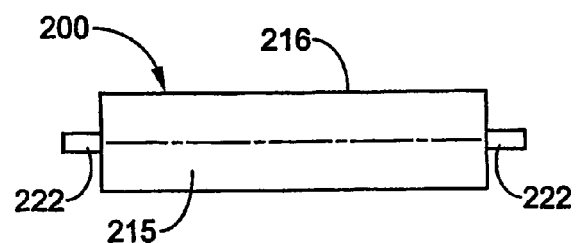
Figure 13C:
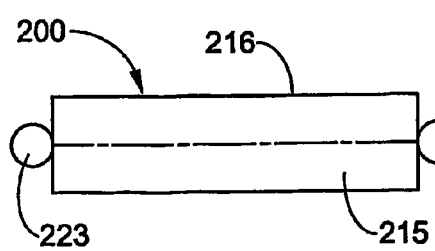
Figure 13D:
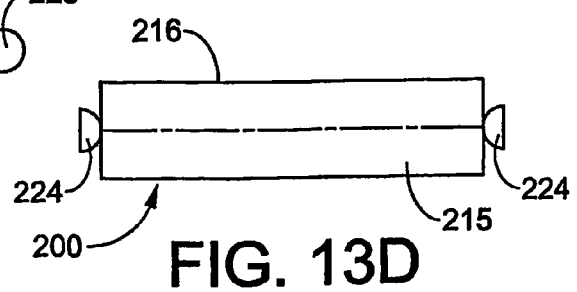

The removable flange can have numerous configurations. FIG. 12 shows a cross section through FIG. 11 wherein the flange 220 is formed as a wedge having a depth greater at its outer end portion than where the same contacts and removably connects to the substrate main body. The removable containment flange can be formed only on one side of the parting line 205. The angle between the vertical side surface of the substrate main body and containment flange top surface can vary from about 10 to about 90° and is preferably from about 15 to about 300. FIG. 13A shows a cross section of a coated substrate 220 with IMC 216 on substrate 215 and triangular flange 221. A rectangular flange 222 is shown in the configuration of FIG. 13B. Circular and semicircular flanges can also be utilized as shown in FIGS. 13C and 13D respectively. The flange can be almost any geometric shape or design such as an ellipse, teardrop, or taper, etc.

For the flange to be easily removable, its point of attachment should be sufficiently thin to be easily separated or broken away from the substrate main portion. The thickness of the flange depends on the substrate-forming composition. Accordingly, the thickness of the flange at the point of attachment immediately adjacent to the substrate is less than about 0.7, 0.6 or 0.5 mm, and preferably is from about 0.1 to about 0.4 mm. The thickness of the flange in a direction away from the point of attachment to the substrate main portion can increase to any desirable thickness, which is generally greater than the thickness at the point of attachment. The width of the flange from the substrate main portion to the peripheral edge thereof is generally less than about 10 mm, desirably from about 2.5 to about 8 mm, and preferably from about 3 to about 6 mm.

The mold can be modified so that the removable containment flange is formed into either or both of the mold halves described above as by machining, milling operation, or the like. The flange typically is formed along one or both sides of parting line 205 as shown in, e.g., FIG. 12. Due to the design and substantial incompressibility of the containment flange at the narrow point of attachment to the substrate main portion, the IMC composition predominately stops at the attachment point between the substrate main body and containment flange as shown In FIGS. 13A-D. That is, a compression gradient is formed and the IMC is able to flow across the relatively thick, compressible substrate main portion but cannot substantially flow across the relatively thin incompressible containment flange edge attached to the substrate main portion.

The mold can be further modified so that the removable containment flange extends onto a surface of a substrate to prevent flow of IMC composition onto predetermined areas of the show or other surface. FIG. 15A illustrates a substrate 300 having a removable containment flange 320 extending across a portion of show surface D as well as around a portion of the perimeter of the substrate to contain IMC 316 to a predetermined area of show surface D.

Figure 15B:
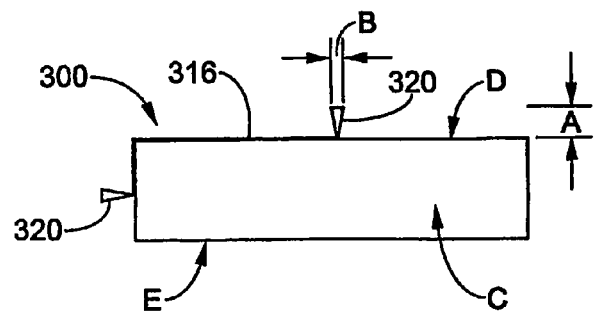
FIG. 15B is a cross sectional view of a FIG. 15A through 15B-15B.

FIG. 15B is a cross sectional view through 15B-15B of FIG. 15A. This view shows that IMC 316 is contained in a predetermined portion of show surface D by removable flange 320.

Accordingly, the removable IMC containment flange can be utilized in any area(s) on any surface of a substrate to preferentially coat predetermined portions thereof. Crisply defined coating boundaries or areas on a substrate can be created when a removable containment flange is utilized on a substrate, especially a show surface thereof. Many different surface aesthetic effects can be created utilizing containment flanges, especially removable ones. Obviously, the modification to the mold can include any number of containment flanges. The containment flange can be utilized to create any type of pattern, design, logo, lettering, insignia, etc. Different colored coatings can be incorporated on different areas of a substrate which have containment flange boundaries, thus allowing for shading, contrasting colors, special effects, etc.

Removable containment flanges also can be used on a substrate at an edge opening adjacent to a moveable mold section such as a slide or core. The removable flange will prevent or block IMC composition from leaking into the moveable core area and possibly binding the same.

Referring to FIGS. 17A-18C, shown is yet another mold modification. In this respect, IMC composition can be injected on a center portion of a substrate surface at 310 of substrate 325 as shown in FIG. 17A, or a corner of a substrate surface at 410 of substrate 400 as shown in FIG. 18A. Typically, the IMC composition is injected at a location on a molded substrate that is inconspicuous when the article is used. Alternatively, the IMC composition can be injected onto a portion of the substrate that later can be removed or cut away from the substrate. For example, if desired, the IMC composition injection area at tab 103 of FIG. 4 can be cut away where R connects to the main portion of the molded substrate, leaving a substantially square coated article.

As stated above, IMC composition flow can be promoted or enhanced by creating an area of increased relative thickness or a compressible zone on the substrate at the location of IMC injection. FIGS. 17A-C illustrate a molded substrate 325 including a compression differential to promote flow on a substrate. FIG. 17A is a front view of substrate 325 wherein a containment flange 330 can be utilized to confine the IMC to the show surface 302 of the substrate. The IMC composition can be injected onto the injection inlet area 310 of the substrate during a molding cycle. Area of substrate injection 312 is also illustrated in phantom as the substrate has been injected from the back side 304 opposite of show surface 302 to hide any flow lines or undesirable edges which may be present after a sprue is removed.

The area of increased thickness 308 forms a flow zoneu which is selectively used to control the flow of the coating composition and thus the thickness and surface area of the resultant coating. For example, for an area of increased relative thickness that has a corresponding increased compressibility, the flow zone promotes flow of the IMC composition to the contiguous surface of the substrate for the area adjacent thereto which has a relatively thinner cross section. This flow zone is also adjacent the injection site for the coating and is distinct from other complex cross sections having increased thickness as may occur from reinforcing struts or similar structural details insofar as the flow zone is designed for selectively controlling the flow of the coating by providing a channel of increased (or decreased) compressibility. These areas of increased (or decreased) thickness may also serve as flow zones, however. Likewise, the flow zone may comprise an area of decreased compressibility such as occurs for a thinner cross section area like a peripheral flange. In this case, the flow zone acts as containment zone for the coating and does not need to be adjacent to, and in fact probably will be remote from, the injection site.

FIG. 17B shows a cross-sectional side view through 17B-17B of the molded substrate of FIG. 17A. Show surface 302 and back surface 304 have a variable distance or thickness therebetween. Sprue 314 is formed during the substrate injection molding step. The area behind injection inlet area 310 is provided with area 308 that has a greater thickness than substrate regions 306 to promote IMC composition flow. Area 308 has a thicker section or greatest depth at its central portion where the IMC composition is injected onto show surface 302. The thickness of the substrate tapers from injection inlet area 310 and reaches a relatively.constant depth in substrate section 306. The relative depth or thickness provided by area 308 provides a readily compressible area for the IMC composition and promotes flow to other desired areas of show surface 302. As shown in FIG. 17C, the IMC 320 completely covers show surface 302. Alternatively, if desired, substrate 325 can contain other compression differential zones such as a mold runner described above and can be coated in preselected areas utilizing substrate compressibility.

Figure 18A:
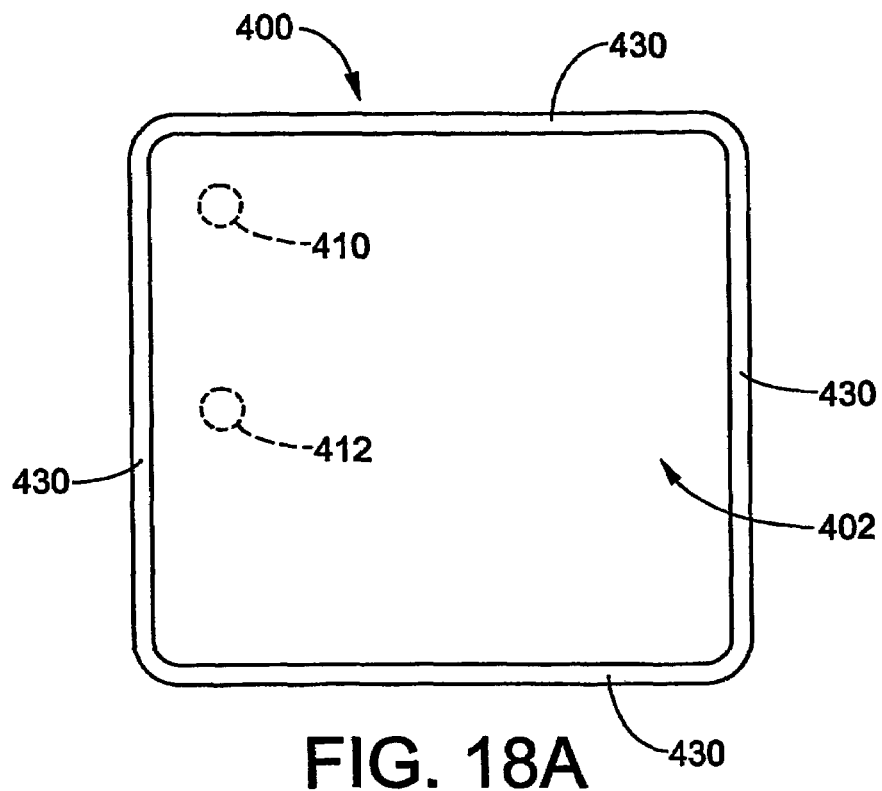
FIG. 18A is a front view of a molded substrate containing a readily compressible area at the location wherein a coating composition is to be injected onto the surface of the substrate.
Figure 18C:
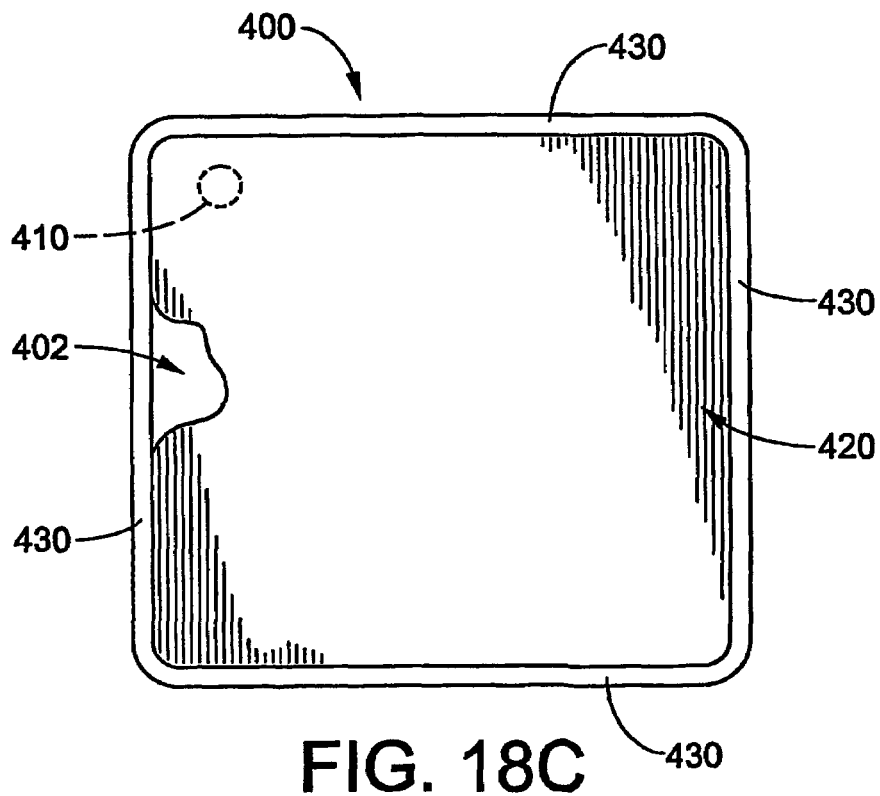
FIG. 18C is the front view of the coated article shown in FIG. 18B.
Figure 18B:
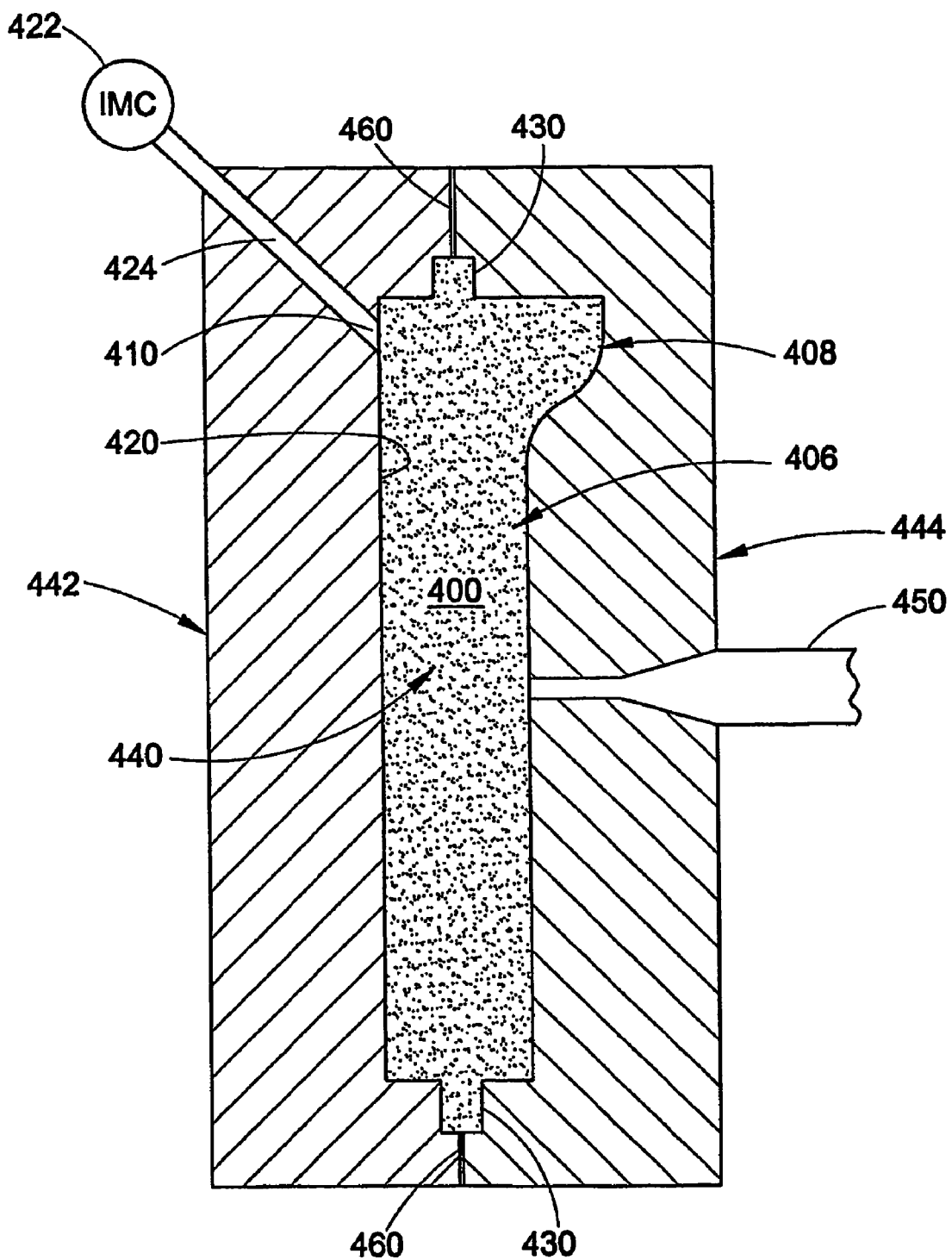
FIG. 18B is a cross-sectional side view of the plaque shown in FIG. 18A while the molded substrate is still in a mold cavity and a coating composition has been applied to the show surface of the substrate.

FIGS. 18A-C show another use of substrate compressibility to create a compression differential which promotes IMC composition flow at an injection inlet area. FIG. 18A shows substrate 400 with show surface 402 and containment flange 430. The IMC composition is injected at inlet area 410. Substrate-forming material is injected at a location behind area 412. FIG. 18B is a partial cross section of plaque 400 situated in a mold cavity 440 between mold halves 442 and 444. The molded substrate has been coated with IMC composition 420 from injection device 422 through inlet channel 424 via a nozzle at inlet area 410. The mold parting line 460 also is illustrated. The IMC composition is injected onto the substrate at area 408 which has an increased thickness compared to other portions of the substrate including area 406. The IMC composition can more easily compress the substrate in area 408 as compared to area 406 due to the increased thickness thereof. FIG. 18C illustrates the front view of show surface 401 of coated substrate 400.

The substrate has a thickness ratio at the location of IMC injection (such as 310 in FIG. 17A) relative to another portion of the substrate intended to be coated of from about 1.1:1 to about 10:1, desirably from about 1.25:1 to about 2:1, and preferably from about 1.3:1 to about 1.5:1.

To promote smooth, even flow of IMC composition across the show surface, a smooth or substantially constant transition is made from the location of IMC composition injection to the other substrate areas as shown in FIGS. 17B and 18B. The transition zone can be considered as a taper or ramp. Of course, as stated herein other features such as runner sections and coating containment flanges also can be incorporated to control or promote IMC composition flow. In addition, controlling the substrate and/or mold temperatures can affect this flow.

Figure 20:
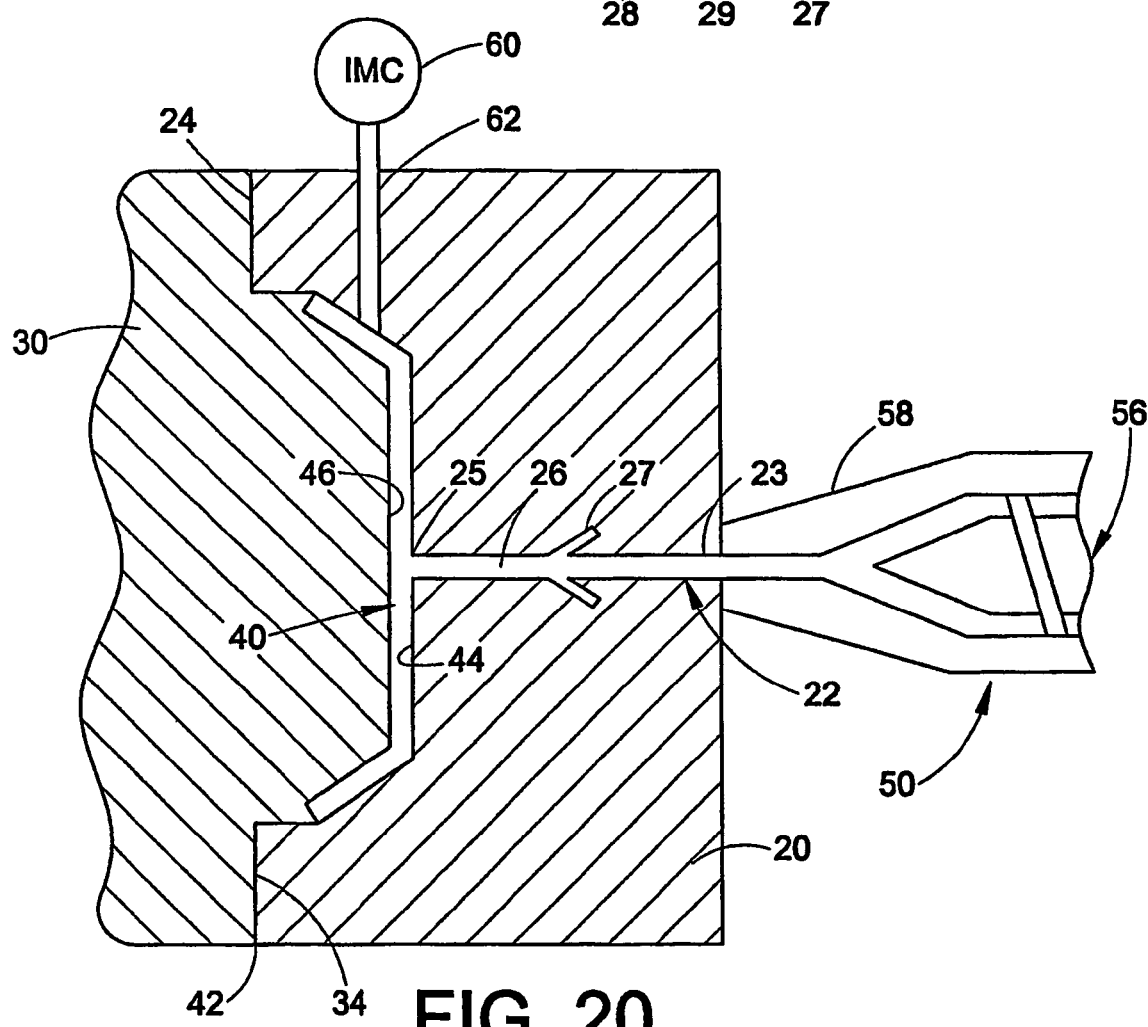
FIG. 20 is a schematic view of a mold cavity having a mold runner and an IMC composition inlet.

FIGS. 19-25 show a mold runner 22. Referring to FIG. 20, first composition injector 50 is shown contacting mold half 20 so that nozzle or resin outlet 58 mates with mold half 20 and can inject into mold cavity 40 through mold runner 22. Mold runner 22 provides a passageway in the mold half for transferring a substrate composition from injector 50 into mold cavity 40. The mold runner may also be referred to as a sprue bushing, mold runner drop, etc.

Figure 22A:
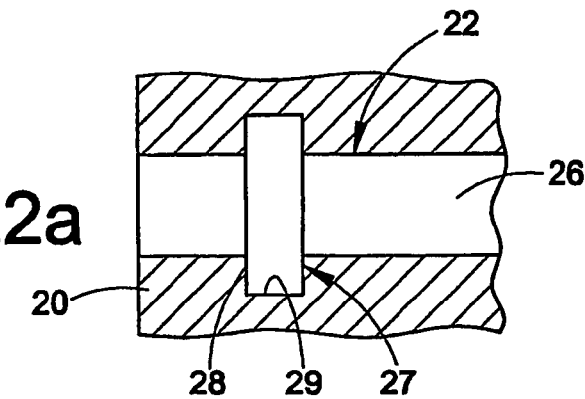
FIG. 22(a) is a close up view of the containment shroud illustrated in FIG. 22.

FIG. 22 shows a schematic view of one type of mold runner 22 which has a body member that can be separate from or integral with a mold half 20 or platen 21, i.e., the mold runner can be a separate, removable, and distinct member inserted in and attached to a mold half or can be formed or shaped into a mold half itself. Mold runner 22 has a first and second ends, 23 and 25, and extends therebetween. First end 23 receives melted material from the injection molding machine and second end 25 discharges the material into the mold cavity 40, with the material subsequently forming a substrate in the mold cavity which can be coated. Mold runner 22, except in the region of the containment shroud, is cylindrical in cross section to avoid placing stress, strain, and shear forces on the substrate during injection; other suitable shapes, include but are not limited to, conical, helical, and tapered, etc. As shown in at least FIG. 20, the nozzle 58 is positioned or seated at first end 23 for a molding operation. Mold runner 22 includes containment shroud 27 which prevents IMC composition from flowing or terminates such flow through passageway 26 and into the molding apparatus 50.

The containment shroud is generally a recess or void which extends around the entire perimeter or circumference of at least one portion of the mold runner passageway between the first and second ends. In other words, the containment shroud is generally a cavity, formed in the mold runner about a peripheral segment of the passageway generally on a plane substantially perpendicular to the passageway axis. Each containment shroud has a base portion and a terminal or end portion as shown as 28 and 29 respectively in at least FIG. 22(*a*). Base portion 28 has a predetermined width along an axial length of the passageway. The containment shroud also has a height and extends generally radially outward from the passageway perimeter.

As noted above, the containment shroud has a design or structure effective to prevent or terminate an IMC composition from passing therearound or therethrough from the passageway egress to the passageway substrate-forming material entrance. After the substrate-forming composition has been injected into the mold cavity, the mold runner arid containment shroud are also filled therewith. The filled shroud utilizes the relative incompressibility of the substrate in this thin area as a barrier to prevent IMC composition flow.

In another example of a runner, the base portion has a width or thickness greater than or equal to the terminal portion, such as shown in FIGS. 23 and 24, to allow substantially easy removal of the partially coated substrate sprue including a projection formed in the containment shroud. The width of the base portion can vary but generally ranges from about 0.025 to about 6.4 mm and preferably from about 0.06 to about 0.4 mm. Accordingly, the terminal or radially outward portions of the containment shroud often have a width less than the base portion. The height of the containment shroud between the base portion and the terminal portion can vary but generally is from about 0.1 to about 2 mm, desirably from about 0.2 to about 0.65 mm, and preferably from about 0.25 to about 0.4 mm. The containment shroud can be located anywhere along the mold runner passageway between first and second ends 23 and 25, respectively. Preferably the containment shroud is located toward the second end where the IMC composition can enter the mold runner. The containment shroud can be located as close to the second end as about 0.25 mm. The shroud design and location depends on numerous factors such as the diameter of the runner, the substrate composition and the need to remove the molded workpiece from the mold.

In FIG. 22, the containment shroud 27A is shown as an annular ring having a plane perpendicular to the axis formed by the passageway between first and second ends 23 and 25, respectively. The annular ring has squared-off corners at the end portion thereof. FIG. 23 shows containment shroud 27B which is set at an angle so that the sprue formed by the substrate which fills the passageway and containment shroud can be easily removed from the mold runner after a molding and coating operation is performed and the coated part is removed from the mold. Shroud 27B is generally set at an angle Ø measured from an axis formed by the passageway and height measured from the base portion to the terminal portion. Angle Ø may vary from about 1° to about 90°, desirably from about 25° to about 65°, and preferably from about 40° to about 55°.

The passageway in FIG. 23, between the containment shroud and second end 25, is also shown to have a diameter greater than that of the passageway between the containment shroud and first end 23. This configuration makes the sprue easier to remove. Thus, when the sprue is pulled out of the mold in the direction of the mold cavity, the containment shroud is flexible and conforms to the diametrical space provided in the passageway nearest the second end. The containment shroud also can have a taper or wedge 27C as shown in FIG. 24.

Figure 25:
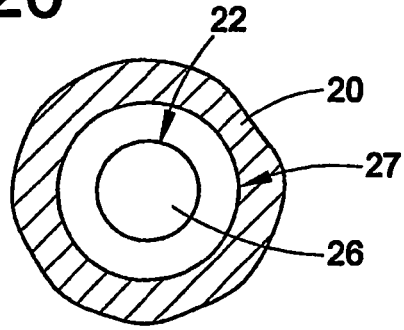
FIG. 25 is a cross section through a mold half at a vertical section where a mold runner containment shroud is present.

FIG. 25 illustrates a cross section through a vertical axis of a mold half at a location where the containment shroud is present such as in FIG. 22. As can be seen, containment shroud 27 extends completely around the perimeter of passageway 26 to prevent IMC composition from flowing through the mold runner. The mold runner in this example is of a cylindrical shape and therefore the containment shroud extends radially around the passageway perimeter.

To understand how the mold runner functions, the following description of an coating process is described, with reference made to FIGS. 19-25, a substrate-forming material is introduced into an injection molding apparatus wherein the material is heated above its melting point. The substrate-forming material is moved through the apparatus utilizing rotating screw 56 and deposited at the end of the barrel. During a molding cycle, the mold halves 20 and 30 are brought together in a closed position as shown in FIG. 19 and the molten substrate-forming material is injected from nozzle 58 of the injection molding apparatus through mold runner 22 into the mold cavity 40. Generally, an amount of substrate material is injected into the mold cavity so that a final product desirably fills the mold cavity. As shown in FIG. 19, the substrate-forming material takes the shape of the mold cavity and also includes a sprue portion 53 which resides in mold runner 22, generally conforming to the shape thereof and completely filling the same. Once the substrate-forming material has been injected, it begins to cool and solidify until it reaches a point where an IMC composition can be applied thereto. An IMC composition then is injected into mold cavity 40 onto a show surface of the substrate material. As shown in FIG. 20, injector 60 injects an IMC composition onto show surface 44. Through pressure, the IMC composition spreads from inlet 62 across show surface 44. Inasmuch as the IMC is injected onto the same side of the substrate rhaterial as sprue 53 and mold runner 22, the IMC composition will flow along sprue 53 toward the injection apparatus 50.

Figure 21:
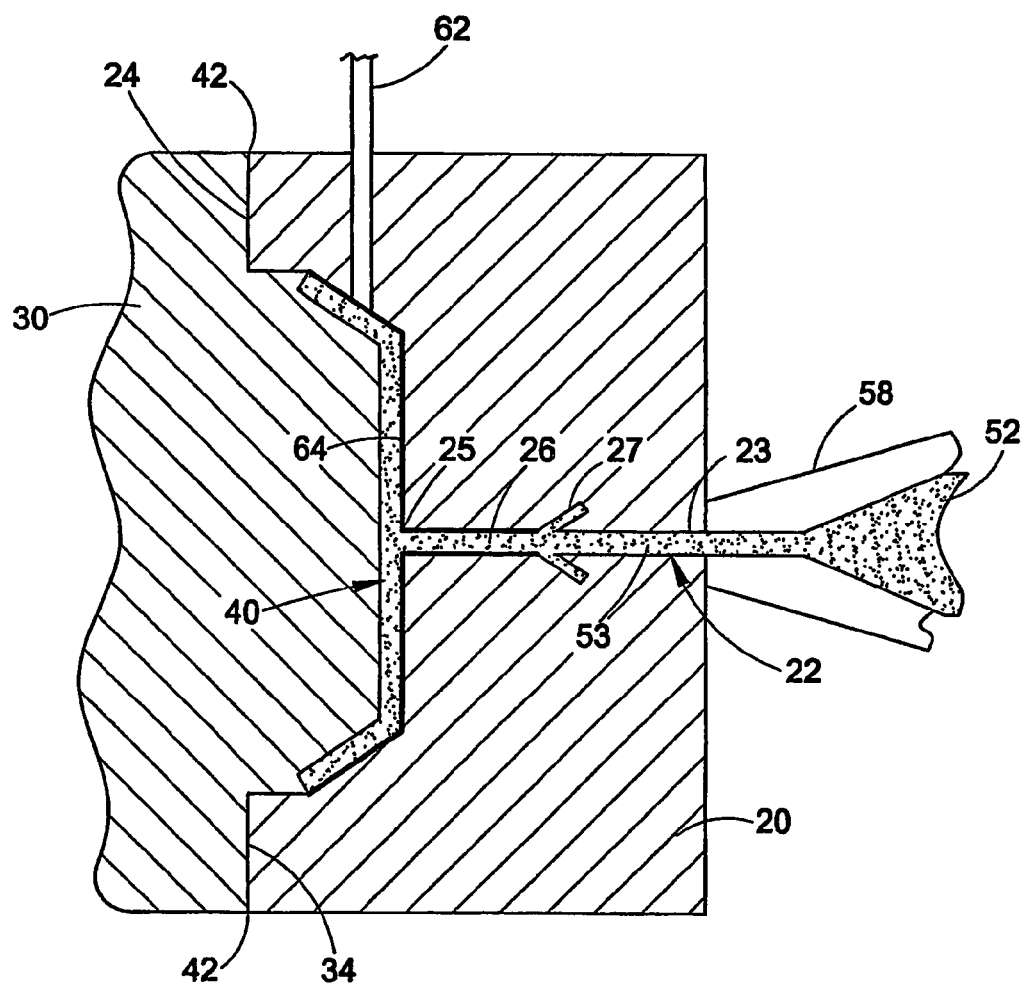
FIG. 21 is a schematic view of the mold cavity from in FIG. 20 where the mold cavity has been filled with a substrate-forming composition and an IMC has been applied thereto. The mold runner having a containment shroud prevents coating composition from entering the injector for the substrate-forming material.

FIG. 21 illustrates a coated substrate in a mold cavity wherein a containment shroud has been utilized to prevent the IMC composition from flowing through a mold runner. The uncured IMC composition spreads out across the surface of the substrate and also enters second end 25 of the mold runner 22. The coating composition travels up the sprue from the second end 25 toward the first end 23 of the mold runner due to the compressibility of the sprue material. Once the IMC composition encounters the containment shroud 27, it is prevented from any further spreading due to the relative incompressibility of the substrate composition in the containment shroud. Thus, the IMC composition is prevented from reaching first end 23 and entering injection apparatus 50 and contaminating the substrate-forming material therein.

After the IMC composition has been injected into the mold cavity, it cures and adheres to the substrate and forms a coating. Thereafter, the fixed mold halves are parted and the coated article removed along with sprue 53, which contains a rim or projection formed by the mold runner containment shroud, The sprue is easily removed from the mold runner as the projection formed in the containment shroud is generally flexible. Further coated articles can be produced because the IMC composition has not contaminated the injection apparatus, and no deposits of the IMC composition remain in the runner system.

FIGS. 26-29 show yet another mold modification to control IMC flow. Substrate 740 includes barrier 743 that includes a barrier rim of substrate material 742, a substrate injection inlet area 744 and an IMC composition injection area 746. A containment flange 748 as described above is also shown. Again, while flange 748 is shown to completely surround the area of substrate coated with coating 741, the flange may only partially surround the area to be coated based on the configuration of the workpiece and the flow characteristics of the mold. Furthermore, the substrate injection inlet area 744 is free of the IMC due to the presence of barrier 743.

As shown in FIG. 27, barrier rim 742 extends around the perimeter of substrate injection inlet area 744. Barrier rim 742 contains a protrusion which is raised or elevated relative to the surface of the adjacent substrate, outside of the barrier rim perimeter. Typical substrate injection orifices are generally round or cylindrical; accordingly, barrier rim 742 is also formed as a complementary shape around the orifice and can be annular but generally can be any shape.

Figure 28C:
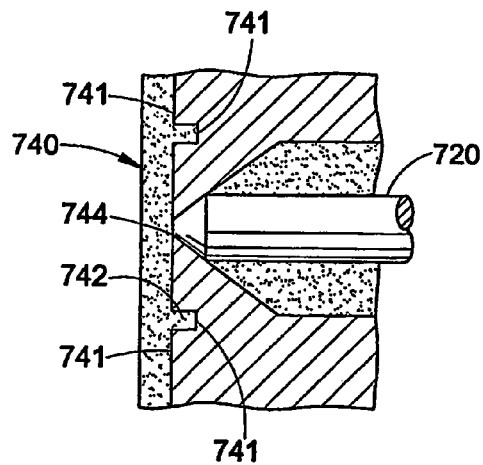

The height of the barrier rim and other portions of the substrate can be measured from one side of the substrate to the other, such as from the show surface to the back or opposite surface, i.e., between the corresponding mold halves, as described above. The rim height or thickness refers to a maximum height unless specifically stated. The elevation or height of the barrier rim can also be measured from the show surface to the distal end of the rim. The character Y in FIG. 28B illustrates the height of the barrier rim 742 which is substantially the same throughout its width which is designated Z. The barrier rim height Y in conjunction with width Z is designed to substantially prevent IMC composition 741 from flowing into the substrate injection inlet area 744 as shown in at least FIG. 28C. After the IMC composition is injected onto substrate 740 surface at injection inlet area 746 in FIG. 27, the coating spreads across the surface between a mold cavity surface and the substrate surface by compressing the substrate. Eventually, IMC composition 741 reaches the base of barrier rim 742 as shown in FIG. 28C and attempts to flow up barrier rim 742 by compressing the width Z of the rim. Width Z is relatively thin and thus is sufficient to prevent IMC composition 741 from flowing into substrate injection inlet area 744 as shown in FIG. 28C at least because the rim width is relatively incompressible and forms an IMC seal or barrier to coating flow.

Figure 30A:
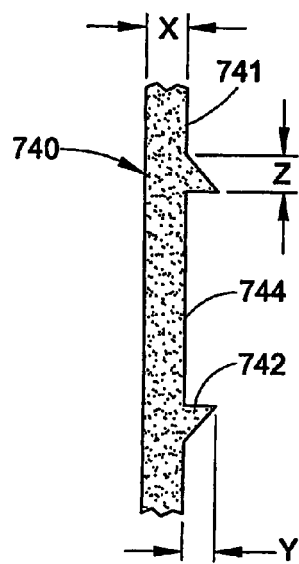
FIGS. 30A-C are partial cross-sectional views through a coated substrate having barrier rims of varying configurations.

Width Z can be made sufficiently thin so that IMC composition does not flow onto the rim itself, much less the substrate injection inlet area. Accordingly, the ratio of the barrier rim width Z to the thickness X of the substrate (as shown in FIG. 30A) adjacent to the barrier (measured from the substrate front surface to the back surface) ranges generally from about 0.1:1 to about 2:1, desirably from about 0.25:1 to about 1:1, and preferably from about 0.3:1 to about 0.8:1. The required compression differential can vary depending on substrate composition, mold temperature, and workpiece design, etc., and can be readily determined through limited experimentation.

The differences in the height ratio between the barrier rim height Y (742 in FIG. 27) and the substrate thickness X are also sufficient to prevent IMC composition from breaching the substrate injection area or orifice, and ranges generally from about 0.1:1 to about 5:1, desirably from about 0.5:1 to about 2:1, and is preferably about 1:1.

FIGS. 28A-C illustrate a process for forming the substrate injection orifice barrier and show a cross-sectional view through a portion of a mold assembly similar to the apparatus shown in at least FIG. 1 and described above. FIG. 28A shows a partial view of a mold cavity 40 interposed between first and second mold halves 710 and 712 respectively. In FIG. 28A, the mold cavity is also shown having barrier forming relief 721 including rim 722. A substrate-forming material 740 is injected into mold cavity 40 at substrate injection inlet area 724 when gate pin 720 is backed away from the entrance as shown in FIG. 28B. As described above, the gate pin is merely one example of a substrate inlet control.

During a typical molding cycle, gate pin 720 is backed away from inlet 724 as shown in FIG. 28B, allowing substrate-forming material 740 to flow into mold cavity 40 to a predetermined level. Barrier 743 including barrier rim 742 is also formed with the substrate material. After a sufficient amount of substrate forming material 740 has been injected, gate pin 720 is moved into a closed position as shown in FIG. 28C to stop the flow of substrate-forming material and for cosmetic purposes to leave a clean shut-off on the surface of the molded article.

After the substrate has cooled, achieves a suitable modulus, or otherwise is capable of accepting a liquid on its surface, the coating composition is injected into the mold cavity. Upon injection, IMC composition 741 flows across the surface of the substrate until it encounters barrier 743. Upon reaching barrier rim 742, the IMC composition compresses the rim width against the mold cavity and ceases to flow into the substrate inlet area or substrate injection orifice at least because the relative compressibility of the substrate barrier rim width along the height thereof. Thus, as shown in FIG. 28C, IMC composition 741 is prevented from reaching or flowing to gate pin 720 and passing between it and surrounding clearances.

Figure 29:
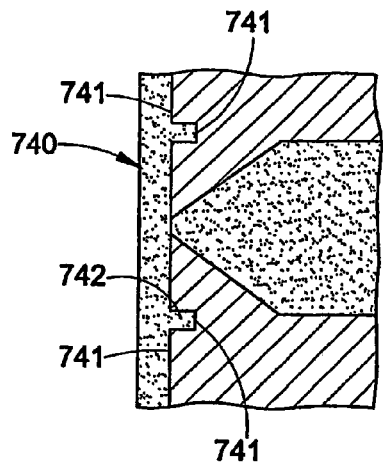
FIG. 29 is a partial cross-sectional view through a mold illustrating a coated substrate having a barrier which prevents IMC composition from entering the orifice of the injector for the substrate-forming material.

FIG. 29 illustrates a barrier for a substrate injection apparatus without a gate pin. Accordingly, modifying the mold as described above provides a barrier for substrate injection orifices even though a gate pin might not be utilized. IMC composition cannot access the substrate injection inlet area due to the presence of the barrier.

Figure 30B:
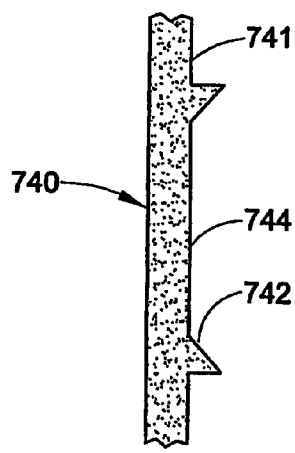
Figure 30C:
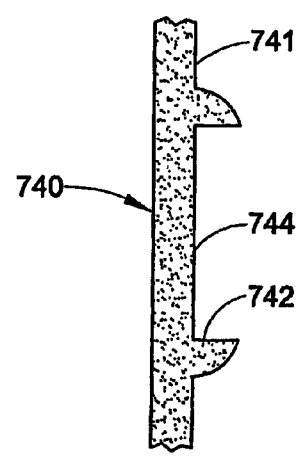

Barrier rim 742 may have both varying heights and or widths and thus may have many different shapes or designs other than the barrier rim shown in FIGS. 28B, 28C, and 29 which has two walls with substantially equal heights formed at substantially perpendicular 90° angle to the substrate main surface and substantially constant width. FIG. 30A illustrates an alternative barrier design having tapered rim 742 with varying height Y and width Z. The main portion of substrate 740 has a thickness or depth X. Rim 742 has one wall substantially perpendicular to the substrate main surface and a slanted wall at about a 45° angle. The upper, thinnest portion of the rim is substantially incompressible, and thus the IMC composition substantially cannot flow into substrate injection inlet area 744. FIGS. 30B-C illustrate other possible variations for barrier rim design, showing a different tapered rim and a partially rounded rim. Design of the barrier rim is limited only by mold cavity constraints wherein it is desirable to allow the substrate with barrier to be easily removed from the mold cavity after molding and cqating.

Figure 9:
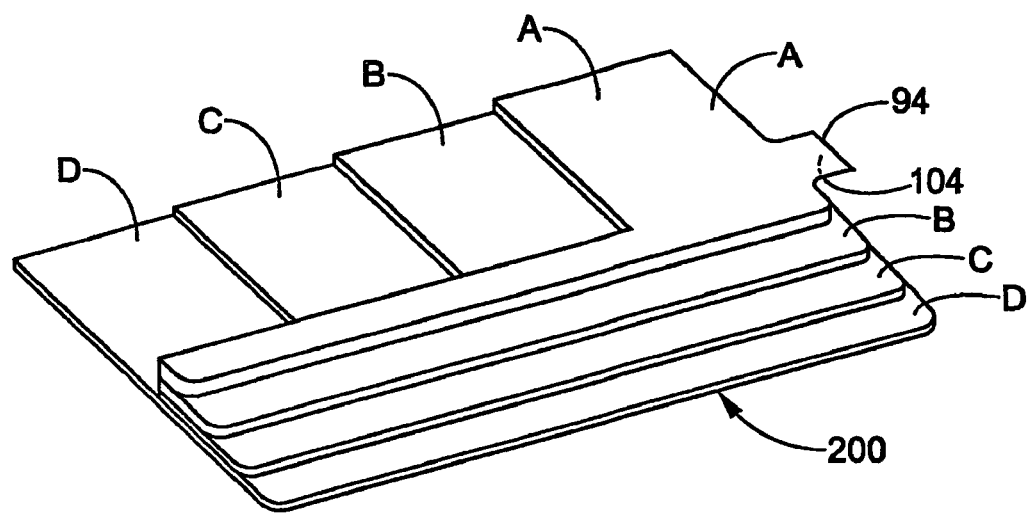
FIG. 9 is a front elevation view of a substantially flat molded plaque with a substantially flat show surface.

Referring to FIG. 9, a mold for producing a plaque 200 is shown which has been modified for accepting an IMC composition Is shown. The mold cavity width is 30.5 cm, and its length is 52 cm. The mold has a hydraulic mold gate located in the center of the cavity for injection of a substrate and a tapered tab for the introduction of IMC composition onto the part surface. The tab is located at the edge portion of the mold.

The thicknesses of tab and Section A are 0.003 mm, Section B is 0.0025 mm, Section C is 0.002 mm, and Section D is 0.0015 mm. The plaque has four panels in a horizontal plane on the left side of the part and four panels in a vertical plane on the right side of the part. The panels on the horizontal plane on the right side of the part measure 15 cm long and 13 cm wide. The panels on the vertical plane measure 3.8 cm wide and 52 cm long. The plaque does not have an IMC containment flange. The mold was placed in a modified 771 Mg (850 ton) CINCINNATI MILACRON™ VISTA™ injection molding machine. ABS resin heated to a temperature of 249° C. was injected Into the mold cavity thus producing the plaque shown in FIG. 9 having sections A-D with the above described dimensions and thicknesses. The front of the plaque had a smooth surface and, thus, the backside of the plaque shows the various thickness contour variations. After a delay or hold time of approximately 120 seconds, a STYLE-COAT™ coating composition was injected through the tab portion of the plaque onto the front surface thereof. The chart below details how the coating composition flowed onto the different sections of the plaque.

| Amount of IMC ($cm^3$) | % of full IMC shot | Section A % fill/mm | Section B % fill/mm | Section C % fill/mm | Section D % fill/mm |
|---|---|---|---|---|---|
| 0.52 | 25 | 75/0.025 | 15/0.013 | 0/0 | 0/0 |
| 1.05 | 50 | 98/0.076 | 85/0.041 | 10/0.015 | 0/0 |

From the part surface area to be coated and the desired coating thickness, an amount of 1.97 $cm^3$ was determined capable of producing a full IMC shot to cover the entire plaque.

As can be seen from the chart, upon IMC injection onto the plaque surface, the top left panel and the inside vertical panel (runner section A) were preferentially coated when 25% of a full shot was utilized. Thus, this example shows that Section A is an effective runner section whereby the coating prefers to flow down the plaque along Section A and out to the side thereof before flowing into thinner sections B, C, and D. When 50% of a full IMC shot was utilized, the IMC began to flow from Section A and B into Section C.

The plaque shown in FIG. 9 did not contain a containment flange. When coating levels above 50% of a full shot were utilized, the coating composition leaked out of the mold cavity through the parting line. Thus, it was determined that a containment flange was needed to keep the IMC composition on the desired portion of substrate surface.

Figure 10:
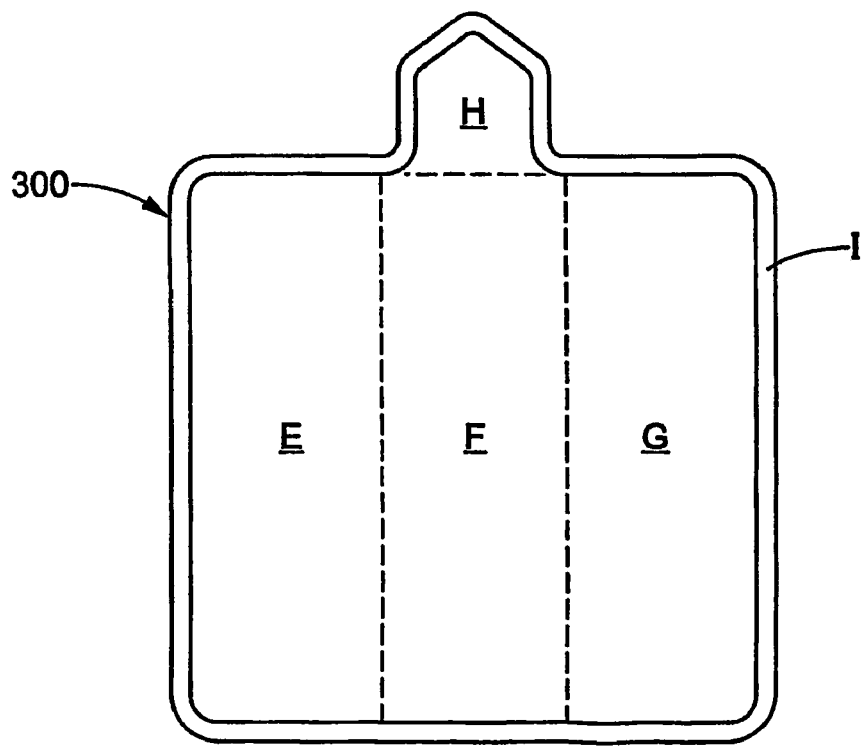
FIG. 10 is a front view of a molded substrate with areas of varying thickness illustrated.

FIG. 10 shows a thermoplastic article 300 with a variety of substrate thicknesses. The example parts were generated using a 45 Mg (50 ton) injection molding machine and 15 cm square steel mold, both of which were modified as described above. The substrate-forming material was a PET thermoplastic and the IMC was STYLECOAT™ primer. The mold temperature was 121° C. with a 30 second delay time prior to IMC composition injection.

Sections E (0.29 cm thick), F (0.22 cm thick), and G (0.15 cm thick) are representations of varying part thickness as shown by the chart below. Section H (0.15 cm thick) represents the tab design utilizing a thicker middle section which facilitates a flow channel at the nozzle tip site. Section I (0.06 cm thick) represents the thin-sectioned containment flange. An objectve in designing and modifying a mold with thin and thick sections is to help channel flow of the IMC composition in a desirable fashion. This can be manifested in several ways which can include:

1. Channeling the IMC composition flow at the tab site (Section H) which preferentially deposits the IMC composition Inside the mold parting line onto the part surface.
2. Channeling IMC composition flow to more critical areas (Sections E, F, and G).
3. Restricting IMC composition flow along the periphery and/or other portions of the mold to contain the IMC composition on the desired surface of the part and within the parting line (Section I).

The observed IMC coverage for the mold is as follows:

| % of full IMC shot | Section E % fill/mm | Section F % fill/mm | Section G % fill/mm | Section H % fill/mm | Section I % fill/mm |
|---|---|---|---|---|---|
| 50 | 100/0.076 | 80/0.051 | 20/0.025 | 100/0.051 | 0/0 |
| 80 | 100/0.10 | 100/0.076 | 40/0.051 | 100/0.076 | 0/0 |
| 100 | 100/0.10 | 100/0.076 | 100/0.076 | 100/0.10 | 0/0 |

The foregoing show that this enhanced flow mechanism has advantages which include preferential flow and deposition to selected regions on a part as a result of varying thickness and containing IMC composition on the part surface within the parting line resulting from a thin-sectioned containment flange.

The present method relates to modifying an existing mold to allow it to be utilized in connection with an injection molding machine so that the mold can be used to produce coated articles. The injection molding machine can be any of the known injection molding machines which has at least one injection apparatus to inject a molten material. The molding machine either can include a separate apparatus for injecting IMC composition or can include an integral system.

As discussed in greater detail below, several embodiments relate to the molder being supplied with some or all of the equipment necessary to apply the IMC. This equipment includes IMC composition injecting apparatus; IMC composition injector nozzles; hoses, fittings and other hardware necessary to connect the injecting apparatus to the injector nuzzle; and IMC composition mixing, and/or storage equipment. , In another embodiment, and IMC composition injecting apparatus is provided that is capable of working in connection with the molding system to inject the IMC at the desired time, in the desired location, and at a specific temperature, amount of pressure.

Figure 32:
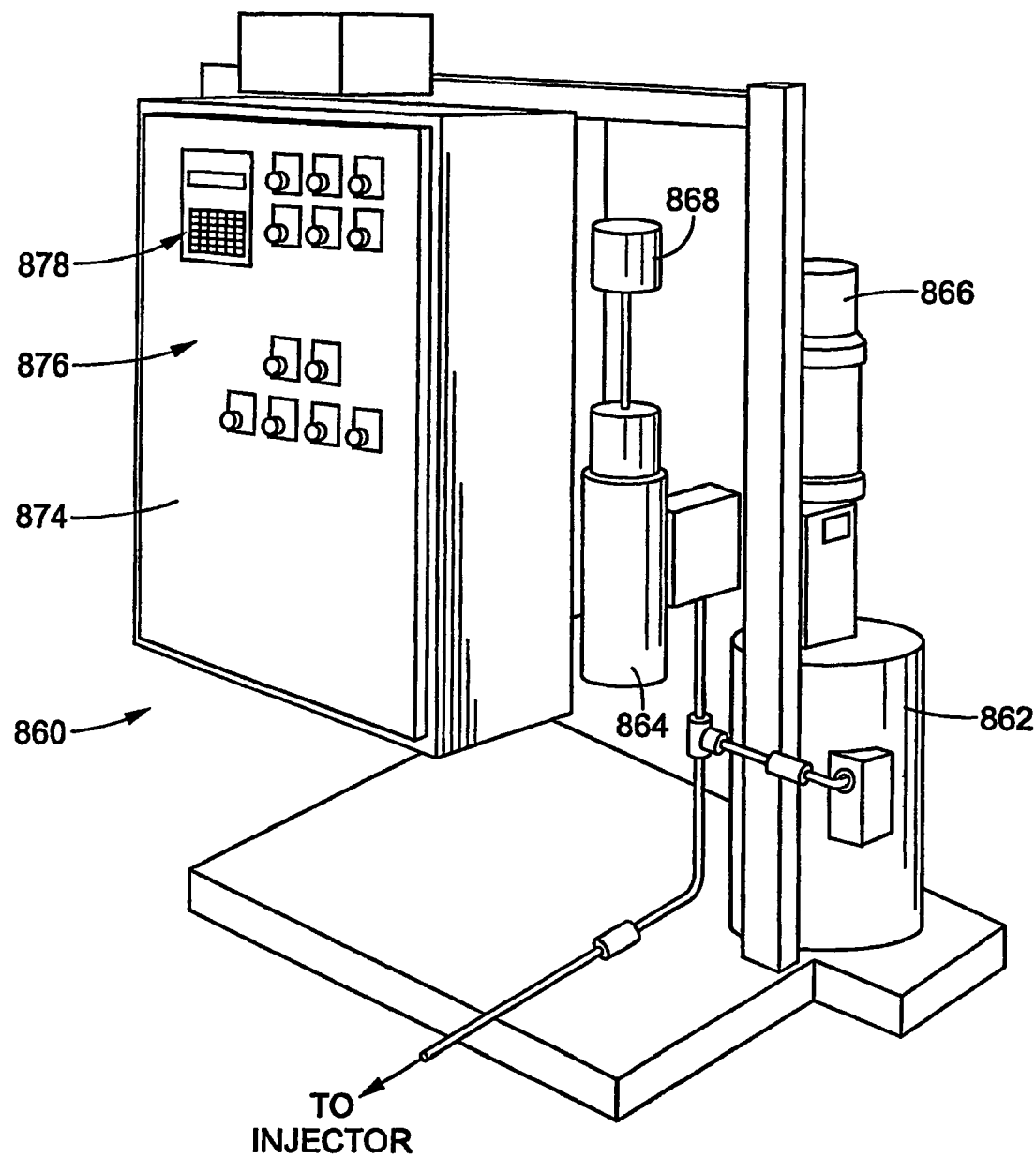
FIG. 32 is a dispense-and-control apparatus for an IMC composition.

FIG. 32 shows an IMC dispense and control apparatus 860 adapted to be connected to molding apparatus 10 and provide IMC capabilities and controls therefor to molding apparatus 10. Control apparatus 860 includes an IMC container receiving cylinder 862 for holding an IMC container such as a vat of an IMC composition. Suitable IMC compositions include those disclosed in, e.g., U.S. Pat. No. 5,777,053. Control apparatus 860 further includes a metering cylinder or tube 864 adapted to be in fluid communication with the IMC container when received in the receiving cylinder 862. A transfer pump 866 is provided on control apparatus 860 and is capable of pumping IMC composition from receiving container 862 to metering cylinder 864.

Metering cylinder 864 is selectively fluidly connectable to IMC composition injector 62 on molding apparatus 10. Metering cylinder 864 includes a hydraulic means such as a piston 868 for evacuating IMC composition from metering cylinder 864 and directing it to injector 62. A return line (not shown) is connected to injector 62 and to receiving container 862 to fluidly communicate therebetween.

Control apparatus 860 further includes an electrical box 874 capable of being connected to a power source. Electrical box 874 includes a plurality of controls 876 and a touch pad or other type of controller 878 thereon for controlling the dispensing of IMC composition to mold cavity 40. A compressed air connector (not shown) is provided the control apparatus 860 for connecting apparatus 860 to a conventional compressed air line. Compressed air is used to drive transfer pump 866 and remove IMC composition from control apparatus 860 and its fluid communication lines during a cleaning operation. Additionally, air can be used to move solvent through the communication lines for cleaning purposes.

Dispense and control apparatus 860 may include a remote transmitter (not shown) adapted to be positioned, in preferred embodiment, on one of mold halves 20,30. The transmitter may be, for example, a conventional rocker switch that sends a signal to apparatus 860 upon actuation. The transmitter may be positioned on one of mold halves 20,30 (or elsewhere) such that it is actuated upon closure of mold halves 20,30. The signal sent from the transmitter is used to initiate a timer (not shown) on control apparatus 860.

Alternatively, molding apparatus 10 may be equipped with a transmitter or transmitting means that has the ability to generate a signal upon closure of mold halves 20,30. A conventional signal transfer cable can be connected between molding apparatus 10 and control apparatus 860 for communicating the signal to control apparatus 860. Such an arrangement eliminates the need for an independent transmitter to be connected to one of mold halves 20,30.

Alternatively or in addition to the transmitter, control apparatus 860 may include at least one remote sensor (not shown) adapted to be positioned on one of mold halves 20,30 or otherwise adjacent to mold cavity 40 to measure its pressure and/or temperature. This sensor can be any known type of such sensor including, for example, a pressure transducer, thermocouple, etc. The sensor(s) and control apparatus 860 are operatively connected via conventional means to allow measurement signals to pass therebetween.

To prepare for injection of IMC composition into mold cavity 40, a container of a desired IMC composition is placed in receiving cylinder 862. Metering cylinder 864 Is fluidly connected to injector 62. Return line 868 is fluidly connected to injector 62 and receiving cylinder 862. Control apparatus 680 is connected to a suitable power source such as a conventional 460 volt AC or DC electrical outlet to provide power to electrical box 874. The remote sensor is appropriately positioned on one of mold halves 20,30 as described above.

Referring to FIG. 1, a first composition is placed in the hopper 52 of the molding apparatus 10. First injector 58 is moved into nesting or mating relation with fixed mold half 20. Through conventional means, i.e., using heated extruder barrel 54 and rotating screw 56, the first composition is heated above its melting point and directed to the nozzle 58. Mold halves 20,30 are closed thereby creating mold cavity 40. The transmitter or sensor, if present, is positioned on one of mold halves 20,30 such that, when they are closed, a signal is sent to control apparatus 860 indicating that mold halves 20,30 are closed and that the molding process has begun. Upon receipt of this signal, hereinafter referred to as $T_0$, dispense and control apparatus 860 initiates the timer contained therein, which tracks elapsed time from $T_0$. At predetermined elapsed time intervals, control apparatus 860 actuates and controls various IMC related functions to ensure that the IMC composition is delivered to mold cavity 40 at a desired point in the molding process. Thus, control apparatus 860 operates concomitantly with molding apparatus 10.

After $T_0$, the molding process continues and a nozzle valve (not shown) of nozzle 58 is moved to an open position for a predetermined amount of time to allow a corresponding quantity of the substrate-forming material to enter mold cavity 40. Screw 56 provides a force that urges the first composition into mold cavity 40 until the nozzle valve returns to its closed position. The first composition fills mold cavity 16. Once mold cavity 16 is filled and packed, the first composition is allowed to cool to a temperature below its melting point. The first composition does not cool uniformly, with the material that constitutes the interior of the molded article generally remaining molten while the material that constitutes the surface begins to harden as it cools more quickly.

After injection, the resin in mold cavity 40 begins to solidify, at least to an extent such that the substrate can withstand injection and/or flow pressure subsequently created by introduction of the coating composition. During this solidification, the forming article cools somewhat, and this Is believed to result in at least a slight shrinkage. A predetermined amount of an IMC composition is ready to be introduced into the mold cavity through injector 62. The point in the molding process when the IMC composition is injected, hereinafter referred to as $T_{IMC}$, can be characterized as an elapsed time from $T_0$. For the second injector 62 to inject the IMC composition precisely at $T_{IMC}$, control apparatus 860 must perform several functions at precise times between $T_0$ and $T_{IMC}$. Each of these functions occurs at a predetermined elapsed time relative to $T_0$. One such function is filling metering cylinder 864 with a desired amount of IMC composition. This function occurs in advance of $T_{IMC}$. Thus, at the preselected elapsed time, control apparatus 860 opens a valve (not shown) that permits fluid communication between the IMC composition-filled container and metering cylinder 864. Transfer pump 866 then pumps coating composition from the container to metering cylinder 864. When metering cylinder 864 is filled a desired amount, the valve closes to prevent more IMC from entering. The amount of IMC composition permitted to enter cylinder 864 is selectively adjustable.

After cylinder 864 is filled and just prior to TIMc, control apparatus 860 opens a pin or valve (not shown) on injector 62 to allow fluid communication between injector 62 and mold cavity 40. The valve is normally biased or urged toward a closed position, i.e., flush to the mold surface, but is selectively movable toward the open position by control apparatus 860. Specifically, for example, an electrically powered hydraulic pump (not shown) of control apparatus 860 is used to move the valve. Immediately or very shortly thereafter, at $T_{IMC}$, the hydraulic means of cylinder 864 evacuates the IMC composition contained therein and delivers it to injector 62 where it passes through into mold cavity 40.

The IMC composition is injected into the mold cavity at a pressure ranging generally from about 3.5 to about 35 MPa, desirably from about 10 to about 31 MPa, and preferably from about 13.5 to about 28 MPa.

Once coating composition has been injected into mold cavity 40, second injector 62 is deactivated, thus causing flow of coating composition to cease. The coating composition flows around the molded article and adheres to its surface. Curing or crosslinking of the coating composition can be caused by the residual heat of the substrate and/or mold halves, or by reaction of the composition components. The coating composition subsequently cures in the mold cavity and adheres to the substrate surface, thus forming a coating thereon. If the residual heat of the substrate is used to effect curing, the IMC composition is injected before the molded article has cooled to the point below where proper curing of the coating can be achieved. The IMC composition requires a minimum temperature to activate the catalyst or initiator present therein which causes a cross-linking reaction to occur, thereby curing and bonding the coating to the substrate.

As detailed above, the IMC composition preferably is injected soon after the surface of the molded article has cooled enough to reach its melt temperature. The determination of when the melt temperature is reached can be determined from time elapsed from $T_0$ based on results from previous trials using the same materials and mold conditions. Alternatively, if a temperature sensor is used in addition to or in place of the transmitter, the point at which the molding resin reaches its melt temperature can be determined directly by observing the internal mold temperature if the melt temperature of a particular resin is known. This point also can be determined indirectly by observing the internal mold pressure. As noted, when the molded part cools to its melt temperature and begins to solidify, it contracts somewhat, thus reducing the pressure in the mold, which may recorded through the use of a pressure transducer (not shown) in the mold.

In the above described process, the mold is generally not opened or unclamped before the IMC is applied. That is, the mold halves maintain a parting line and generally remain substantially fixed relative to each other while both the first and second compositions are injected Between IMC composition injections, control apparatus 860 uses transfer pump 866 to circulate IMC composition through the system. The valve on injector 62 remains in its closed position thereby preventing any IMC composition from entering mold cavity 40. One purpose of circulating the IMC composition between cycles is to prevent any particular portion of the coating composition from becoming undesirably heated due to its proximity to heating mechanisms on molding apparatus 10. Such heating could detrimentally impact the material properties of the IMC or could solidify the IMC composition in the fluid lines.

Controls 876 and keypad 878 of control apparatus 860 enable an operator to adjust and/or set certain operating parameters of control apparatus 860. For example, the controls can be manipulated to increase or decrease the amount of IMC composition to be filled in cylinder 864 by allowing the valve that controls communication between cylinder 864 and receiving container 862 to remain open for a longer duration. Additionally, the controls can be manipulated to adjust the elapsed time from $T_0$ that cylinder 864 is filled by transfer pump 866 and/or the amount of time elapsed from $T_0$ that cylinder 864 is emptied by the hydraulic means. This time may be adjusted to more closely approximate Timc.

The sensor can be a pressure transducer mounted adjacent mold cavity 40 and adapted to record a pressure therein. In this configuration, the transmitter and timer of control apparatus 860 can be eliminated. Rather than using the time elapsed from $T_0$ to dictate when the mold processes are begun, in this embodiment, control apparatus 860 injects IMC composition into mold cavity 40 based on the pressure recorded in mold cavity 40 by the pressure transducer sensor. The IMC composition is desirably injected into the mold cavity at the same point in the molding process, $T_{IMC}$, irrespective of which type of sensor is used. Thus, rather than being time dependent, this embodiment is pressure dependent.

Such control is possible because pressure in mold cavity 40 initially rises as molding resin fills mold cavity. The pressure rises more as mold cavity 40 is packed. Finally, the pressure in mold cavity 40 begins to decrease as the molded article cools and begins to solidify. At a predetermined pressure during the cooling phase that corresponds with TIMc, IMC composition preferably is injected into mold cavity 40. The predetermined pressure is generally based on the specific type of resin used and may also be based on the specific type of IMC composition used.

Based on pressure measurements taken by the pressure transducer sensor, the series of functions performed by control apparatus 860 also can be dependent on the pressure measured in mold cavity 40. Thus, each of the functions can occur at a predetermined pressure in mold cavity 40 so that the IMC composition can be injected Into mold cavity 40 at the desired point in the molding process. Injecting IMC composition into mold cavity 40 onto the surface of a molded article based on the pressure measured in the mold cavity is described in U.S. Pat. No. 6,617,033.

The term "transducer" is meant to cover any type of sensor or other means for measuring or recording a value for an associated variable. Thus, a pressure transducer alternatively can be a plurality of pressure sensors positioned at varying locations around mold cavity 40. In this arrangement, control apparatus 860 would perform its functions, including injecting the IMC composition, based on a plurality of pressure measurements. For example, control apparatus 860 could perform its functions based on predetermined averages of the plurality of pressure measurements taken by the sensors. This arrangement may be desirable because a plurality of pressure transducers may be able to better determine the actual pressure observed in mold cavity 40.

Alternatively or in addition to the previous embodiments, a temperature sensor can be used to determine when to inject the IMC composition. That is, once the temperature mold cavity 40 reaches a temperature below the known melt temperature of the material being used, the IMC composition can be injected.

Some conventional injection molding machines and molds already are equipped with one or more transducers adapted to measure pressure in mold cavity 40. These machines are often capable of sending a signal representative of the measured pressure or pressures to associated equipment such as control apparatus 860 through conventional data transfer means. In this case, the need for a remote pressure transducer sensor is eliminated. Control apparatus 860 need only be suitably connected to the injection molding machine 10 to receive the signal representative of the pressure measurement(s) taken from mold cavity 40.

The sensor also can be a thermocouple mounted adjacent mold cavity 40 and adapted to record a temperature. In this configuration, the timer of control apparatus 860 can also be eliminated. Further, control apparatus 860 injects IMC composition into mold cavity 40 based on the temperature recorded therein by the thermocouple sensor. IMC composition desirably is injected into mold cavity 40 at the same point in the molding process, TIMc, during each molding cycle.

Dispense and control apparatus 860 also can be equipped with and/or connected to a data collection means. The data collection means can be an on-board hard drive or other recording medium capable of recording the operating parameters set on control apparatus 860 for one or a series of molded articles. Of course, other alternative arrangements are possible such as, for example, connecting the apparatus to a network and recording operating parameters at a remote location. In any case, the data collection means can record the predetermined elapsed time settings from $T_0$ that the various control apparatus functions are set to use and/or the actual elapsed time intervals when the various functions occur. For example, for each injection of IMC composition, the data collection means can record the time from $T_0$ that transfer pump 866 fills metering cylinder 864, the time from $T_0$ that the valve of injector 62 opens, the time from $T_0$ that hydraulic cylinder 868 evacuates metering cylinder 864 and injector 62 injects the IMC composition into mold cavity 40 and/or the time from $T_0$ that the valve of injector 62 closes. Of course, other functions also can be recorded including the number of IMC composition injections for a specific amount of IMC composition, the hydraulic pressure used to evacuate metering cylinder 864, etc.

If one or more pressure transducers are used in place of the rocker switch (a time dependent sensor), the data collection means can be used to record related measurements therewith. For example, the data collection means can record the specific measured pressures at which time the various functions of control apparatus 860 occur. Likewise, if the sensor is a thermocouple, the temperature measurements taken thereby can be recorded.

In any case, the data or information recorded by the data collection means can be used for quality control purposes. For example, a specific coated part can be examined upon being ejected from mold cavity 40 and compared against the data collected on the specific injection of IMC composition associated with that particular part. If the part does not meet certain quality control requirements, such as lack of adhesion between the coating and the substrate, lack of scratch resistance, surface imperfections, lack of adequate coating coverage, etc., the present parameters, whether time dependent, pressure dependent, temperature dependent or otherwise, can be adjusted to improve the coating characteristics of future coated parts.

Control apparatus 860 also can be equipped with a means for transferring collected data. This could be through any conventional means including providing a disk drive or the like that allows the data to be recorded to a mobile storage medium, providing a data link that is connectable to a local computer, an intranet, the internet, other network, etc. Such means for transferring data can allow remote analysis of the collected data in real-time.

Control apparatus 860 also can include a conventional package code reader (not shown) such as a bar code reader, which can be used to scan a bar code on a particular container of IMC composition placed in receiving cylinder 862. Used in conjunction with the data collection means described above, the bar code for a particular container of IMC composition can be associated with data recorded for all injections of IMC composition from the particular container. Further, the bar code of the container can be associated with a finished parts bin or collection means that receives finished parts with a coating thereon from the molding apparatus. Recording and storing such information allows particular finished parts to be analyzed and easily compared against the data recorded thereabout and the particular IMC composition used.

Control apparatus 860 also can be provided with a user Interface that allows a user to simply select a part icon that represents a series of parts to be molded and coated. Selection of a specific part icon on the user interface presets the control parameters on control apparatus 860 whether they are time-based, cavity pressure-based, or otherwise. The user interface eliminates the need for an operator to set the control parameters individually each time a new part series is to be run through the molding and coating process.

Control apparatus 860 also can be provided with a display means such as a monitor (not shown). The display means can display, in real time, any of the data or information being sensed and/or recorded by control apparatus 860. Also, in any of the configurations discussed herein, control apparatus 860 can be configured to only allow a specific number of injections per container of IMC composition. Alternatively, or in addition, control apparatus 860, when used with the bar code reader, could be set to operate only with a specific type of IMC.

In yet another embodiment, a dispense or "basic" apparatus is provided. While this apparatus maintains and dispenses an IMC composition in essentially the same fashion as the "intelligent" control apparatus 860 described above, it does not include a control system. In this respect, the basic apparatus includes only the components necessary to maintain and dispense the IMC composition. The basic apparatus relies on the molding machine or other external controls and/or systems for the control function. However, the basic apparatus still can house data storage and/or data transmission capabilities used for monitoring the pieces produced and/or operating parameters.

As shown in FIG. 32, the intelligent dispensing system 860 can be a standalone unit. Accordingly, in yet another embodiment, the dispense and/or control system is positioned on a moveable cart separate from the molding machine. As can be appreciated, when the system is positioned on a moveable cart, it can be repositionable so that it can be used in connection with more that one molding machine or merely capable of being moved based on operator preferences. Further, by modifying an existing injection molding system by adding a stand alone cart apparatus, especially a fully contained dispense-and-control apparatus or intelligent cart, the molding system can be converted into an IMC-capable molding system with minimum down time of the molding system. Minimizing downtime of the injection molding system greatly reduces the cost associated with providing the molding system with IMC capabilities.

In yet another embodiment, the molding machine is modified so that the IMC dispense system is mounted directly to or is integral with the existing molding machine. While this system essentially functions the same as described above, the dispense and/or control apparatus is designed and shaped to be integral with the molding machine, but there is no external apparatus or cart for housing the mechanical systems and/or the electronic or control systems necessary to inject IMC composition into the mold. The integral system can be either an intelligent system having control functions or a basic system.

Other types of dispensing and/or controlling apparatus also can be used.

In a further embodiment, the molder can be provided with IMC mixing equipment to mix a two part IMC composition at proper levels before injection into the mold cavity. The mixing equipment either can be incorporated into apparatus 860 or can be a stand-alone device that works in connection with the dispensing apparatus.

In a yet further embodiment, existing molds can be modified to work in connection with the dispense and/or control systems described above. A mold is modified by reworking mold halves 20,30 to incorporate at least one injector 60 and nozzle 62. This is done by evaluating the existing mold and then modifying it to achieve a desired result. This can include one or more of the following factors:

standard operating parameters of the existing mold before modification,
    type of steel or other metal used to make the mold halves,
    condition of the mold cavity surfaces,
    type of runner system (if any) used in the mold and runner locations, mold cooling/heabng including fluid flow, location of the cooling/heating lines, and cooling/heating capacity, part design in relation to the show surface including the position of the parting line and ejector pins relative to the show surface; the existence and location of cores, slides, shutoffs or internal parting lines and their location relative to the show surface; and areas of differing part thickness or wall stock, addition of IMC composition injector(s), and design of the substrate or resin injector(s) and location of the substrate injector(s).

While this list is extensive, it does not cover the entire evaluation of the mold modification. Other factors may necessitate additional mold modifications. Further, the order in which they are discussed does not relate to the importance of the particular factor.

An existing mold is evaluated in its preexisting state. In this respect, the mold, before modifications are made, is reviewed to obtain a thorough understanding of optimal parameters including operating temperatures, pressures, the type of resin the mold is designed to receive (e.g., a mold designed for use with a low-temperature resin might not be able to be modified for use with an IMC composition requiring a high curing temperature), the mold temperature based on the resin used, and the fill patterns of the mold.

Another part of the analysis can include a determination of the type of tool steel used for the mold. Different types of tool steels have different properties which affect the machinability and performance of the steel.

Yet another part of the analysis can include a determination of the condition of the mold cavity surfaces which influence the molding process in many ways. First, the surface of the workpiece is a reflection of the condition of the surface of the mold cavity. A rough mold surface produces a workpiece with a dull or rough surface. While this may be desirable for better adhesion for a subsequent out-of-mold coating operation, the surface finish or quality of an IMC will be affected. Second, the surface finish impacts the release of the workpiece after the molding process is completed; a highly polished mold cavity releases a coated workpiece better than a non-polished cavity. Third, if the mold cavity is chromed, the manner in which the mold is modified must be adjusted. (A chrome mold cavity provides excellent surface appearance, mold release and mold life; however, the chrome finish is relatively thin. Therefore, mold cavity changes which necessitate material removal must take into consideration the chrome surface finish.)

The mold can be modified to counteract heat produced by a mold runner if it interferes with the flow if IMC on the show surface. Due to the flow of substrate-forming material through the substrate injector and injector heaters, the mold temperature around the runner is hotter than other portions of the mold. As is stated above, IMC composition flow is influenced by the compressibility of the substrate. Therefore, ff the runner system is near the show surface to be coated, the mold likely will need to be modified to address the temperature issue. These modifications can include but are not limited changing the location of the runner, providing additional mold cooling near the runner, or additional mold heating near other portions of the show surface.

Mold cooling and/or heating can be used to help solidify the resin and/or to control the resin flow. Mold cooling can be used to reduce the time necessary to solidify the resin of the workpiece and to maintain a desired mold temperature, while mold heating can be used to prevent the resin from solidifying before the entire mold cavity is filled. This is especially important in larger workpieces and/or workpieces with intricate configurations. The typical injection molding facility has chilled plant water used for mold cooling. A first type normally used for mold cooling is cooled by a cooling tower and produces water with a temperature between 10 and 21° C. A second type utilizes evaporative coolers which produce cooling water between 21 and 32° C., although these may be elevated if the ambient temperature is above 32° C. A third type of water is heated water wherein the injection molding facility includes capabilities of heating water and supplying the heated water to the molding operation. The molding facility can also have oil heaters for heating oil which can be used to further control mold temperature. The mold can be modified to utilize one or more of these three types of temperature controlled water and/or oil to control the flow of IMC composition. The actual modifications to the mold can include adding cooling or heating lines to the mold halves to allow for the desired flow of heated and/or cooled fluid. Furthermore, the molding system may need to be modified to accept one or more of the types of heated and/or cooled fluid.

As stated above, IMC composition flow is based on the compressibility of the substrate which, in turn, is a function of substrate temperature. As the substrate cools, it begins to solidify, and solidified substrate is not as compressible as is molten resin. Cooled or chilled water can be used to reduce mold temperatures in areas which are too hot, such as the portions of the mold near the runners. Hot spots in the mold can result in areas of the substrate which are more compressible than other areas which are cooler. As a result, the IMC composition, which takes the path of least resistance, flows to the more compressible hot spot. The hot spot can be addressed by adding cooling capabilities or utilizing cooler water. The opposite is true for areas of the show surface which are last to be coated. The resin in these areas may become too solidified before the coating composition has had a chance to completely coat the surface. Since these areas of the substrate have reduced compressibility, the IMC composition may stop flowing before reaching the end of the show surface. Mold heating can slow the solidification of the substrate. By modifying the mold so that heated water and/or oil is pumped through these areas, the substrate remains in a more molten state and flow of the IMC composition is enhanced.

The mold can be modified to utilize one or more of these types of temperature controlled water and/or oil to help cure the IMC. As stated above, the IMC is cured based on heat and, more particularly, on the heat of the substrate. Therefore, modifying the mold to include heating and/or cooling lines in the mold portion adjacent the show surface can promote curing of the IMC by optimizing the mold temperature based on the resin and IMC used.

A flow modeling or analysis can be performed on the mold to determine the optimal modifications which can be made thereto. These modifications relate to obtaining a desired flow pattern of the IMC composition including obtaining complete coverage of the show surface, minimizing flow lines (especially with metallic coatings), and minimizing undesired flow of the IMC. The flow analysis determines the optimal location or placement of the IMC nozzle by breaking the show surface into grids and can utilize computer technology (e.g., flow modeling software) to determine the IMC composition flow based on the characteristics of the mold as it exists prior to modification along with modifications contemplated to introduce the IMC composition. The flow analysis can also determine if more than one IMC composition nozzle is necessary or desirable. The flow analysis also can be performed after the modifications to verify effectiveness.

The present method can involve modifying the cooling and/or heating lines or changing the location of the IMC composition injector if one or more of the lines interferes with the preferred location of the injector. If that location interferes with a cooling and/or heating line, either the line(s) or the nozzle must be moved. In view of the fact that nozzle location is very important to achieve the desired flow, modifying the line may be required. However, just eliminating the line is not always an option in that it may produce a hot or cold spot in a show surface of the mold cavity. As a result, it must be determined whether relocation of the IMC composition nozzle or modification of the cooling or heating water and/or oil line(s) is preferable. This can be done by additional flow analysis or modeling by running simulated test(s) based on both a nozzle relocation, a cooling line modification, or both. If it is determined that the best solution is to modify the cooling line, known methods can be used to remove a section of the cooling line and/or relocate the cooling line. Bubblers or fountains can be utilized if a section of the cooling is removed. While the flow is reduced using bubblers, this area of the mold still receives some flow of cooled or heated fluid, thereby reducing the severity of the hot or cold spot in the mold. This allows the optimum nozzle location to be utilized even though it interferes with a cooling and/or heating line.

The design of the article relative to the show surface influences modifications made to the mold. These modifications relate to obtaining a desired flow pattern of the IMC composition, including obtaining complete coverage of the show surface, minimizing flow lines (especially with metallic coatings), and minimizing undesired flow.

If the show surface includes ribs, bosses (internal openings), or intricate surfaces, the IMC composition might not flow as desired. The modification can include addition of a mold runner which can direct and/or promote flow. By creating areas of increased part thickness, flow can be enhanced by the increased compressibility of the substrate. In general, changes to the mold can be made which increase the compressibility of the substrate to promote or direct IMC composition flow. Alternatively, if the show surface is near a parting line, a core, a slide, a shutoff, an internal parting line or an ejector pin, it may need to be modified to restrict IMC flow. As stated above, the IMC composition is introduced into the mold cavity under significant pressure and will follow the path of least resistance. Therefore, if the show surface includes any one of these mold components,. the IMC composition can exit the show surface through these components which prevents the IMC from fully coating the show surface and can affect the function of the mold. Therefore, the mold is evaluated to determine if the IMC composition will flow into these mold components or locations. The IMC which is applied under pressure will enter any opening which is greater than about 0.025 mm. Ejector or core pins, for example, typically have a clearance of 0.05 or 0.075 mm and, therefore, if the show surface includes an ejector or core pin, the IMC composition can enter the ejector or core pin cavity and eventually prevent operation of the ejector or core pin. The same is true for parting lines, cores, slides, shutoffs, and internal parting lines. Next, the part configuration must be evaluated to determine if, based on its natural configuration without modification, the part is designed such that the flow of IMC composition into or out of these areas is prevented. For example, if a given molded article naturally includes a flange around the show surface which coincides with the parting line, no modification may be necessary. The naturally present flange can act as a flow restricter. However, if the natural configuration of the article does not include such a feature, the mold can be modified to incorporate flow restricting features that prevent unwanted flow of the IMC composition.

The modification also can include the addition of at least one IMC composition injector. Based on flow analysis or modeling of the mold, the optimum position of the IMC injector is determined, and the mold is modified to Include the nozzle. The IMC nozzle preferably is near the perimeter of the mold itself and on an edge of the show surface. With respect to the position relative to the mold, the IMC composition nozzle is a replaceable component of the mold and, therefore, access to the nozzle helps with the maintenance of the mold. If the nozzle is buried in the middle of the tool, servicing the nozzle will be difficult. Turning to the position relative to the show surface, an IMC nozzle on the edge of the show surface can minimize the visual imperfections associated with the molding process. Flow analysis also can be used to determine whether more than one IMC composition injector is needed and to determine the optimal location of the multiple injectors. More particularly, the IMC composition is directed into the mold cavity in such a way that all portions of the show surface are evenly coated without the appearance of flow lines. The flow analysis determines the optimal placement of the IMC composition injector(s) to obtain the desired flow. Laminar flow across the show surface is preferred. Further, nozzle placement can be evaluated in connection with flow enhancers or restricters described above to determine the optimal nozzle arrangement.

Figure 31A:
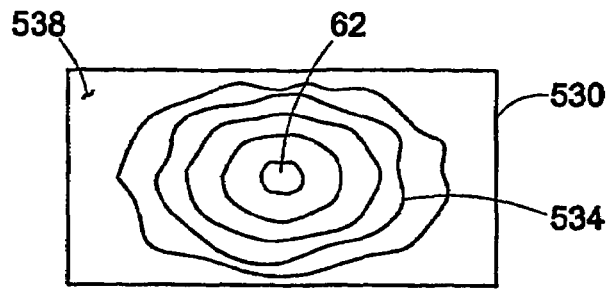
FIG. 31A-D are flow diagrams showing the flow of IMC composition over a "show" surface of a molded article.
Figure 31B:
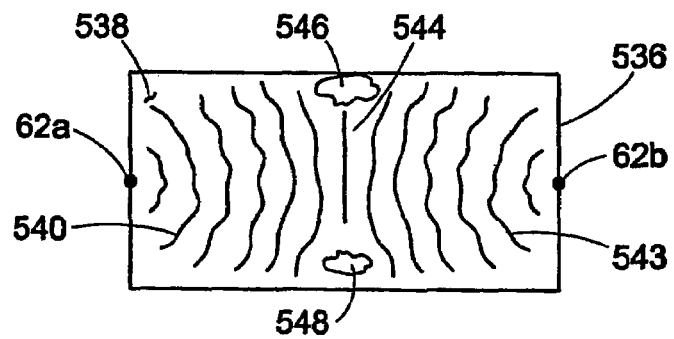
Figure 31C:
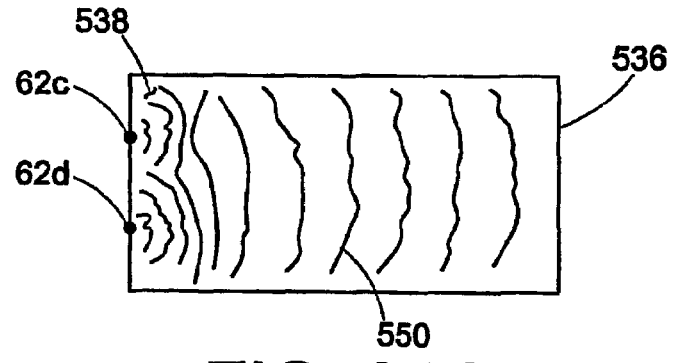
Figure 31D:
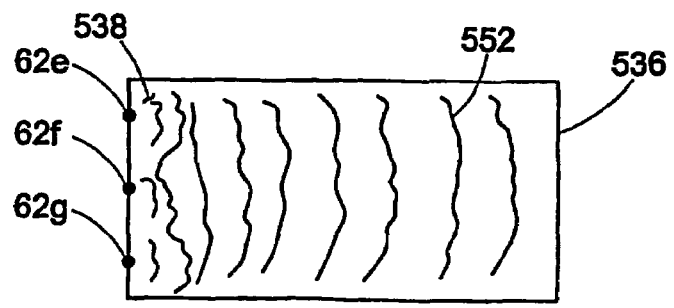

Referring to FIGS. 31A-D, four different styles of nozzle arrangements are shown. FIG. 31A depicts a smaller, less complicated part 530 wherein a single nozzle 62 is sufficient to coat the entire show surface 532. In this example, the nozzle is placed in the center of the show surface and produces laminar flow 534 about nozzle 62 in all directions. FIGS. 31B-D depict a larger and/or more intricate part 536 with a show surface 538 where a single nozzle is not sufficient to produce the level of flow necessary to completely coat the show surface. In FIG. 31B, two nozzles 62a and 62b are shown on either side of show surface 538. The result is the creation of two separate IMC flows 540 and 542 which flow toward each other and meet at the middle of the show surface at a knit line 544. Furthermore, as the separate flows reach each other, pockets 546 and 548 are formed. The result is that the knit line is visible in the completed workpiece and pockets 546 and 548 are not coated. FIG. 31C shows a two nozzle arrangement preferred over the one shown in FIG. 31B. In this respect, nozzles 62c and 62d are spaced apart on the same side of the show surface. As a result, a unified single laminar flow 550 is produced by the two nozzles. In this arrangement, flow begins on one side of the show surface and flows together to the opposite side wherein no knit line is produced and air pockets are minimized. Furthermore, if air pockets are produced, they are adjacent the edge of the show surface which may be acceptable. Referring to FIG. 31D, if more flow is necessary, the mold can be modified to include a three nozzle arrangement 62e, 62f and 62g; however, the three nozzles preferably are still positioned so that a single laminar flow is produced. If necessary, the flow of the individual nozzles 62e-g, can be varied to provide a desired flow. In this respect, nozzle 62f can receive 75% of the flow while nozzles 62e and 62g receive together only 25%. While it has been found that the use of three nozzles has been sufficient to obtain the desired flow, more nozzles could be utilized. In addition, flow enhancers described above including mold heating and/or cooling could be used in connection with the multiple nozzle arrangements to achieve desired flow.

The size and configuration of the actual nozzle is based on the volume of the IMC composition necessary to coat the show surface. Larger surfaces necessitate the use of nozzles with larger inner diameters. The nozzle is mounted to the mold so that it can be removed for cleaning and/or replacement. The nozzle tip is configured to correspond with the shape of the cavity wall.

The modification also can include an evaluaton of and modifications to the resin injector(s). The location of the resin nozzle in relation to the show surface is the primary consideration. If the substrate nozzle is not within or sufficiently near the show surface, no modifications should be needed. If the nozzle is within the range of flow of the IMC, the design of the nozzle preferably is evaluated to ensure that IMC composition does not enter the resin nozzle. If it is determined that the IMC can enter the resin nozzle, the mold can be modified to incorporate one of the several discussed containment flanges to prevent IMC composition from entering the resin injector. In addition, the mold can be modified to include cooling enhancements to reduce the elevated mold temperature which may be present near the nozzle.

If an existing mold is determined to be incapable of being modified, a new mold can be designed exclusively for producing a coated part using the principles, considerations, etc., discussed above.

In modifying a molding system, determining the ultimate machine conditions for the use in a given modified machine using a specific molds, substrate materials and IMC compositions is desirable. In setting up the modified mold, a large number of variables must be controlled relative to one another to produce acceptable parts based on predetermined objectives such as a minimized cycle time for the machine. More particularly, pressures, times and other variables of the modified injection machine vary with the configuration of the mold, i.e., shape of the part being manufactured and the polymeric material being used. Accordingly, the mold modification can include running a series of experiments and/or performing a flow analysis with the modified mold and a specific polymeric material to optimize the process. The volume of any given mold may be calculated. Based on this calculation and the density of the substrate-forrning mateiral, the size of the charge can be determined. Differing machine variables are tried until an optimum, complete filling of the mold in a minimum time, is determined. In these experiments, the mold preferably is fitted with transducers which measure pressure andlor temperature, as various machine variables (e.g., injection speeds and pressures) are altered.

In summary, the present method for modifying an existing injection molding system includes providing an injection molding machine, typically by an injection molder who owns or operates the equipment, providing an IMC dispensing system such as the cart described above, and modifying the molding machine to communicate with the IMC dispensing system. If necessary, the method can further include modifying at least one mold for molding an article to at least include one injector nozzle for directing an IMC composition into the mold cavity at the desired location to coat the show surface of the molded substrate. The IMC dispensing system is connected to the nozzle on the mold and to the molding machine. The mold can be modified to include at least one flow enhancing feature to direct, enhance, and/or restrict flow. Finally, the method can further include steps to ensure that the modified system is functioning correctly, which includes determining the melt temperature of the substrate forming material in question and using that information along with further testing to determine the optimal parameters for injecting the IMC composition into the mold cavity to obtain the desired coverage of the show surface. (These parameters include the amount of the IMC composition to be injected into the mold cavity; the temperature of the IMC composition; the amount of time over which the IMC composition is to be injected; and the pressure at which the IMC composition is to be injected). This, in connection with setting up an initial run for the modified molding system and the mold in question, further ensures that the desired coating properties can be achieved.

We claim:

1. A method of modifying an injection molding system to be operable with a dispensing apparatus so as to render said molding system capable of providing coated articles, said method comprising:
   a) providing
      1) a molding system comprising:
         (A) first operating system, and
         (B) a molding machine that comprises a mold comprising
            (i) first and second mold sections, and
            (ii) in at least one of said mold sections, at least one nozzle for injecting a substrate-forming material, said first operating system communicating with said mold sections such that said sections can be actuated between opened and closed conditions, said first and second mold sections forming a mold cavity when in said closed condition, and
      2) a dispensing apparatus that can hold and deliver a coating composition, said dispensing apparatus comprising at least one of a second operating system for controlling delivery of said coating composition and a data storage means;
   b) modifying said molding machine to communicate with said dispensing apparatus;
   c) adapting said dispensing apparatus to function with said molding system so as to deliver, based on a set of predetermined parameters, said coating composition into said mold when said mold sections are in said closed condition, and
   d) modifying said mold to include at least one of a flow control which utilizes substrate compressibility to control at least a predetermined portion of one surface of a molded article formed and contained in said mold while said mold sections are in said closed condition so as to provide said coated article.

2. The method of claim 1 wherein said molding system and said coating dispensing apparatus are provided by two separate sources.

3. The method of claim 1 wherein said set of predetermined parameters includes dispensing a set amount of said coating composition at a set point in the molding cycle when said substrate is compressible.

4. The method of claims 1 further comprising modifying said mold to further comprise at a desired location at least one nozzle for injecting and directing said coating composition into the mold cavity formed by said mold section to produce a laminar flow of said coating composition across a show surface on said substrate, said dispensing apparatus optionally being selectively and fluidly connectable with the at least one nozzle for the coating composition.

5. The method of any of claims 1 wherein said dispensing apparatus is selectively connectable with said molding machine, said dispensing apparatus optionally comprising a moveable cart system to allow said dispensing apparatus to be re-positionable or being a portable system mountable on said machine.

6. The method of claims 1 wherein said modifying said mold to include at least one flow control includes modifying said mold cavity to produce at least one zone of low substrate compressibility adjacent said show surface.

7. The method of claims 1 further comprising modeling the flow of said coating composition across said substrate so as to determine optimal settings for at least one of said molding machine and said dispensing apparatus an optionally modifying said mold based on said flow modeling.

8. The method of claims 1 further comprising at least one of the following:
 a) determining at least one of a preferred substrate material and a preferred material for said coating composition;
 b) determining at least one of an optimal mold temperature and an optimal substrate temperature for injecting said coating composition into said mold, and
 c) mounting at least one sensor on said mold for measuring at least one mold variable and connecting said at least one sensor to one of said dispensing apparatus and said operating system.

9. The method of claim 1 wherein said operating system of said molding system controls the delivery of said coating composition into said mold.

10. The method of claim 1 wherein said coating composition comprises component parts, said method further comprising providing a mixing apparatus to blend and mix said component parts before injection of said coating composition.

11. The method of claim 1 wherein said coating dispensing apparatus is a self-contained unit.

12. The method of claim 1 wherein said second operating system further includes a remote transmitter, positioned on a mold section, having the ability to generate a signal upon closure of said mold sections.

* * * * *